United States Patent
Giaretta et al.

(10) Patent No.: US 8,885,471 B2
(45) Date of Patent: Nov. 11, 2014

(54) METHODS AND APPARATUS FOR PROVIDING UPLINK TRAFFIC DIFFERENTIATION SUPPORT FOR CIPHERED TUNNELS

(75) Inventors: Gerardo Giaretta, San Diego, CA (US); Julien H. Laganier, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 170 days.

(21) Appl. No.: 13/267,815

(22) Filed: Oct. 6, 2011

(65) Prior Publication Data

US 2012/0263041 A1    Oct. 18, 2012

Related U.S. Application Data

(60) Provisional application No. 61/391,052, filed on Oct. 7, 2010.

(51) Int. Cl.
*H04L 12/26* (2006.01)
*H04L 12/851* (2013.01)
*H04L 29/06* (2006.01)

(52) U.S. Cl.
CPC ........ *H04L 63/0428* (2013.01); *H04L 47/2441* (2013.01); *H04L 63/164* (2013.01)
USPC ........ 370/231; 370/230; 370/230.1; 709/227; 709/228; 709/229

(58) Field of Classification Search
CPC . H04L 47/2408; H04L 47/10; H04L 12/5695; H04L 47/22; H04L 47/2433; H04L 47/2441
USPC .......................... 370/229–240; 709/227–229
See application file for complete search history.

(56) References Cited

U.S. PATENT DOCUMENTS

| 7,096,260 B1* | 8/2006 | Zavalkovsky et al. ........ 709/223 |
| 7,181,532 B1* | 2/2007 | Chan ............................. 709/242 |
| 2005/0088977 A1* | 4/2005 | Roch et al. .................... 370/254 |
| 2007/0165638 A1 | 7/2007 | Hasani et al. |
| 2008/0107119 A1 | 5/2008 | Chen et al. |

(Continued)

FOREIGN PATENT DOCUMENTS

| JP | 2007281754 A | 10/2007 |
| JP | 2009534966 A | 9/2009 |
| JP | 2013518621 A | 5/2013 |

OTHER PUBLICATIONS

3GPP TS 23.402 V8.1.1 (Mar. 2008).*

(Continued)

*Primary Examiner* — Mark Rinehart
*Assistant Examiner* — Mang Yeung
(74) *Attorney, Agent, or Firm* — Abdollah Katbab

(57) ABSTRACT

Systems, methods, and devices for providing uplink traffic differentiation support in hybrid networks including 3GPP and non-3GPP are described herein. In some aspects, a method that facilitates wireless communications is provided. The method includes receiving, using signaling involved in establishing a cipher tunnel, traffic classification information and associated quality of service (QoS) marker information. The method further includes determining, based upon the traffic classification information, that a data packet is associated with a traffic classification. A QoS marker is included within the data packet. The QoS marker is associated with the traffic classification.

80 Claims, 15 Drawing Sheets

(56) References Cited

U.S. PATENT DOCUMENTS

| | | |
|---|---|---|
| 2008/0137625 A1* | 6/2008 | Hori et al. .................... 370/338 |
| 2008/0144602 A1 | 6/2008 | Casey |
| 2009/0300207 A1* | 12/2009 | Giaretta et al. ............... 709/232 |
| 2010/0135287 A1 | 6/2010 | Hosain et al. |
| 2011/0080891 A1 | 4/2011 | Cai et al. |
| 2011/0171953 A1 | 7/2011 | Faccin et al. |
| 2011/0202970 A1 | 8/2011 | Kato et al. |

OTHER PUBLICATIONS

International Search Report and Written Opinion—PCT/US2011/055470—ISA/EPO—Jan. 3, 2012.

3GPP TSG SA WG2 Meeting #83, TD S2-111254,"Clarifications to QoS interworking principles", Ericsson, ST-Ericsson, AT&T, Feb. 21-25, 2011, Salt Lake City, Utah, USA, pp. 1-5.

3GPP TSG SA WG2 Meeting #82, TD S2-105924, "Control plane message QoS control when femto access", Huawei, Hisilicon, Nov. 15-19, 2010, Jacksonville, Florida, USA, pp. 1-4.

3GPP TSG SA WG2 Meeting #82, TD S2-105520, "Provision of UL filters to the UE", Qualcomm Incorporated, Nov. 15-19, 2010, Jacksonville, Florida, USA, pp. 1-4.

3rd Generation Partnership Project; Technical Specification Group Services and System Aspects; Study on Support of BBF Access Interworking(Release 10),3GPP TR 23.839 V0.2.0, Sep. 15, 2010,URL,http://www.3gpp.org/ftp/Specs/archive/23_series/23.839/23839-020.zip.

* cited by examiner

METHODS AND APPARATUS FOR PROVIDING UPLINK TRAFFIC DIFFERENTIATION SUPPORT FOR CIPHERED TUNNELS

CROSS-REFERENCE TO RELATED APPLICATION

This application claims the benefit of U.S. Provisional Application No. 61/391,052, filed Oct. 7, 2010, the entirety of which is incorporated by reference herein.

FIELD

This application is directed generally to wireless communications systems. More particularly, but not exclusively, the application relates to methods and apparatus for providing uplink traffic differentiation support in hybrid networks including 3GPP and non-3GPP elements.

BACKGROUND

Wireless communication systems are widely deployed to provide various types of communication, for instance, voice and/or data can be provided via such wireless communication systems. A typical wireless communication system, or network, can provide access to one or more shared resources (e.g., bandwidth, transmit power, etc.) for multiple users. For instance, a system can employ a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

Wireless communication systems generally employ one or more base stations that provide a coverage area to a plurality of UEs. A typical base station can transmit multiple data streams for broadcast, multicast and/or unicast services, wherein a data stream may be a stream of data that can be of independent interest to a UE. Likewise, a UE can transmit data to the base station or another UE.

Various data streams relate to voice, video or other communication data generated by users or control data that determines the behavior of the UE and/or the network. Based on the type of data being transmitted and other considerations such as the type of service subscribed to by the user, different data streams can have different policy requirements associated therewith. Accordingly there is a need for accurate communication of these policies, including policies for ciphered communications.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description" one will understand how the features of this invention provide advantages that includes providing uplink traffic differentiation support in hybrid networks including 3GPP and non-3GPP elements.

One aspect of the disclosure provides a method that facilitates wireless communications. The method includes receiving traffic classification information and associated quality of service (QoS) marker information. The classification information and associated quality of service (QoS) marker information is received using signaling involved in establishing a cipher tunnel. The method further includes determining, based upon the traffic classification information, that a data packet is associated with a traffic classification. The method further includes including, within the data packet, a QoS marker associated with the traffic classification.

Another aspect of the disclosure provides a non-transitory computer-readable medium. The medium includes code that, when executed, causes a computer to receive, using signaling involved in establishing a cipher tunnel, traffic classification information and associated quality of service (QoS) marker information. The medium further includes code that, when executed, causes the computer to determine, based upon the traffic classification information, that a data packet is associated with a traffic classification. The medium further includes code that, when executed, causes the computer to include, within the data packet, a QoS marker associated with the traffic classification.

Another aspect of the disclosure provides a communications device. The communications device includes a receiver module configured to receive, using signaling involved in establishing a cipher tunnel, traffic classification information and associated quality of service (QoS) marker information. The communications device further includes a processor module configured to determine, based upon the traffic classification information, that a data packet is associated with a traffic classification. The communications device further includes a transmitter module configured to include, within the data packet, a QoS marker associated with the traffic classification.

Another aspect of the disclosure provides a communications device. The communications device includes means for receiving, using signaling involved in establishing a cipher tunnel, traffic classification information and associated quality of service (QoS) marker information. The communications device further includes means for determining, based upon the traffic classification information, that a data packet is associated with a traffic classification. The communications device further includes means for including, within the data packet, a QoS marker associated with the traffic classification.

Another aspect of the disclosure provides a method of facilitating wireless communications. The method includes receiving information relating to differentiated quality of service (QoS) applicable to uplink traffic through a cipher tunnel. The method further includes sending, based upon the received information, traffic classification information and associated QoS marker information for a first uplink traffic flow and a second uplink traffic flow. The traffic classification information and associated QoS marker information are sent using signaling involved in establishing the cipher tunnel.

Another aspect of the disclosure provides a non-transitory computer-readable medium. The medium includes code that, when executed, causes a computer to receive information relating to differentiated quality of service (QoS) applicable to uplink traffic through a cipher tunnel. The medium further includes code that, when executed, causes the computer to send, based upon the received information, traffic classification information and associated QoS marker information for a first uplink traffic flow and a second uplink traffic flow. The traffic classification information and associated QoS marker information are sent using signaling involved in establishing the cipher tunnel.

Another aspect of the disclosure provides a communications device. The communications device includes a receiver module configured to receive information relating to differentiated quality of service (QoS) applicable to uplink traffic through a cipher tunnel. The communications device further includes a transmitter module configured to based upon the received information, traffic classification information and associated QoS marker information for a first uplink traffic flow and a second uplink traffic flow. The traffic classification information and associated QoS marker information are sent using signaling involved in establishing the cipher tunnel.

Another aspect of the disclosure provides a communications device. The communications device includes means for receiving information relating to differentiated quality of service (QoS) applicable to uplink traffic through a cipher tunnel. The communications device further includes means for sending, based upon the received information, traffic classification information and associated QoS marker information for a first uplink traffic flow and a second uplink traffic flow. The traffic classification information and associated QoS marker information are sent using signaling involved in establishing the cipher tunnel.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
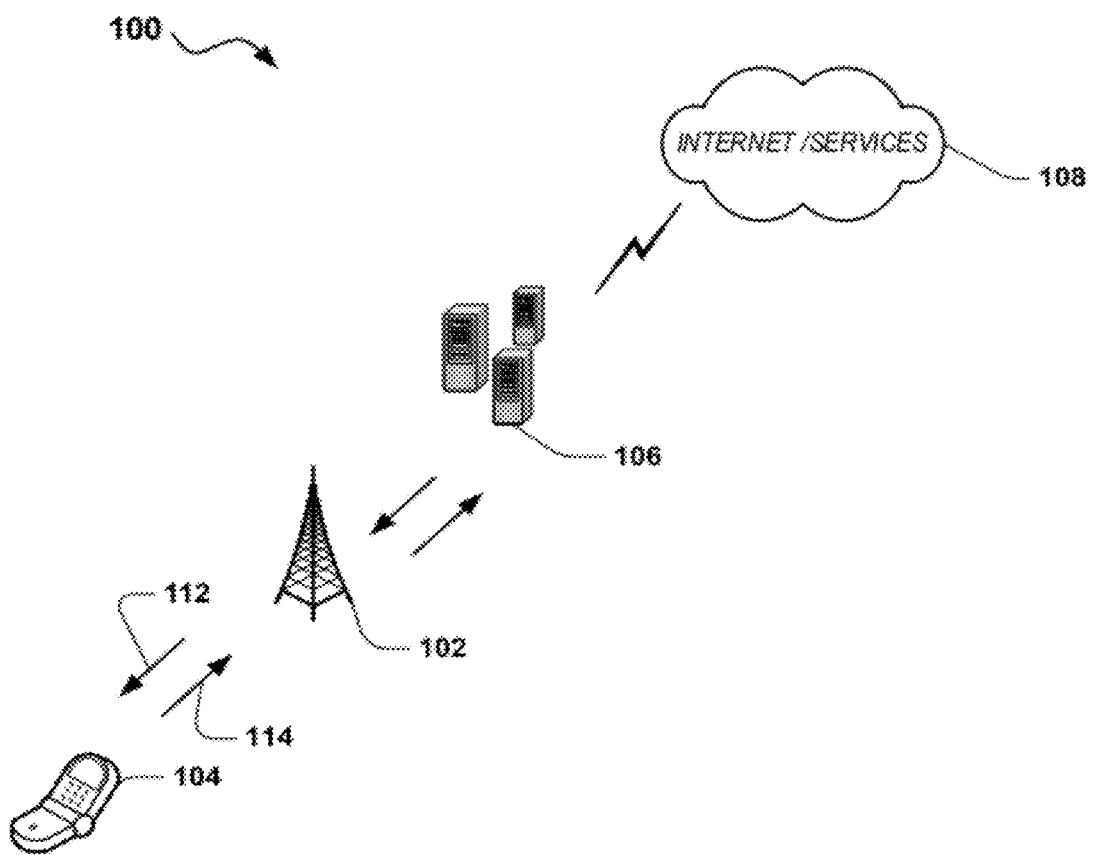
FIG. 1 illustrates a wireless communication system on which various aspects may be implemented.

In various embodiments, the techniques and apparatuses described herein may be used in wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably. In addition, the techniques and apparatus described herein may be used for interconnection between wired networks and between wired and wireless communication networks, as well as in interconnection between two or more wired or wireless communication networks.

A CDMA network may implement a radio technology such as Universal Terrestrial Radio Access (UTRA), CDMA2000 and the like. UTRA includes Wideband-CDMA (W-CDMA) and time-division synchronous code division multiple access (TD-SCDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and CDMA2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

The word "exemplary" is used herein to mean "serving as an example, instance, or illustration." Any aspect and/or embodiment described herein as "exemplary" is not necessarily to be construed as preferred or advantageous over other aspects and/or embodiments.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing may be used for the downlink—that is, from the base station, access point or eNodeB to the terminal or UE. Use of OFDM may meet an LTE goal of spectrum flexibility and may provide cost-efficient solutions for very wide carriers with high peak rates. OFDM is used in standards such as IEEE 802.11a/g, 802.16, HIPERLAN-2, Digital Video Broadcasting (DVB) and Digital Audio Broadcasting (DAB).

Time-frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are composed of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. Twelve of these subcarriers together (per slot) constitutes an RB, so in this implementation, one resource block is 180 kHz. 6 Resource blocks fit in a carrier of 1.4 MHz and 100 resource blocks fit in a carrier of 20 MHz.

In the downlink, there may be a number of physical channels as described above. In particular, the PDCCH is used for sending control, the PHICH for sending ACK/NACK, the PCFICH for specifying the number of control symbols, the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are quadrature phase-shift keying (QPSK), 16-QAM (i.e., quadrature amplitude modulation) and 64-QAM.

In the uplink there may be three physical channels. While the Physical Random Access Channel (PRACH) may only be used for initial access and when the UE is not uplink synchronized, the data may be sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16-QAM and 64QAM.

In embodiments where virtual MIMO/spatial division multiple access (SDMA) is introduced, the data rate in the uplink direction can be increased depending on the number of antennas at the base station. With this technology, more than one mobile device can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It will be understood that the teachings herein may be embodied in a wide variety of forms, and that any specific structure, function, or both being disclosed herein is merely representative. Based on the teachings herein, a person having ordinary skill in the art will appreciate that an aspect disclosed herein may be implemented independently of any other aspects, and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Ciphered Tunnels

Internetworking of 3GPP networks with access mechanisms such as wireless local area network (WLAN) hotspots has drawn recent interest. In an embodiment, the interworking may be based on a security tunnel, which may be established over the WLAN by the UE with a core network entity (such as, for example, an evolved packet data gateway (ePDG) or packet data network (PDN) GW). For example, a PDN GW may provide connectivity between the UE and external packet data networks. The PDN GW may also act as the point of entry and exit for traffic to and from the user equipment. Apart from controlling IP data services, the PDN gateway may perform additional functions such as routing, allocation of IP address, providing access for no-3GPP access networks, and policy enforcement.

A WiFi Broadband Network Gateway (BNG), which may be an access router in a fixed network, may apply traffic differentiation based on policy received over R/Gxx. In an embodiment, traffic differentiation can include admission control. For example, the BNG may be configured to allow only certain UE traffic onto a network. Policies may include traffic filters, QoS class identifiers, and the like. Uplink traffic may be encrypted, or ciphered, by the UE, and downlink traffic may be encrypted by the PDN GW or ePDG. Therefore, only the outer IP header may be visible to intermediate devices performing traffic classification. Accordingly, intermediate devices may not be able to analyze the encrypted contents of a packet, and may rely on information embedded within the outer IP header to perform traffic differentiation.

In an embodiment, the PDN GW or ePDG can mark the outer IP header of downlink traffic, which may facilitate differentiation of the downlink traffic by intermediate devices, such as the BNG. The BNG may determine how to treat DL packets based on the marking of the packets received, and the policy information received over R/Gxx. For example, the PDN GW can analyze the contents of encrypted packets, apply the policy information and map the traffic filters to QoS markers, and apply the markers to the outer IP headers for differentiation by the BNG.

Similarly, for uplink traffic, the BNG may only see the outer IP header coming from the UE. Although the UE can mark packets for UL traffic, however, the UE may not have access to the policies received by the BNG over R/Gxx. Therefore, the UE may not be able to map the traffic filters to the IP header markings. In accordance with various aspects, methods and apparatus are described herein that provide the UE with a mapping of traffic filters and marking.

In-Band Policy Communication

In one embodiment, policy information may be provided to the UE via Internet Key Exchange (IKEv2) signaling. IKEv2 is a protocol used to set up a security association (SA) in the IPsec protocol suite. IKEv2 is used to establish an IPsec tunnel between the UE and the PDN GW or the UE and the ePDG. The PDN GW or the ePDG may signal to the UE, over IKEv2, UL traffic filters and QoS markers, sufficient to instruct the UE how to mark packets. In an embodiment, the policy information can be provided when establishing the ciphered tunnel, and may be communicated via the same mechanisms by which the ciphered tunnel is established. For example, the PDN GW can provide the policy information to the UE via IKEv2 signaling used to establish a cipher tunnel between the UE and the PDN GW.

In an embodiment, the policy information may be provided via a Gx interface, a S9 interface, a Rx interface and/or a Gxx interface to the BNG. The QoS marker signaled by the PDN GW or ePDG to the UE and via Gx/S9*/R/Gxx can include, for example, a DSCP value, an IPsec SPI value, and/or a flow label value. The actual IKEv2 signaling can include, for example, a new message, a new notify payload, and/or an extension to an existing message, e.g., an extension of a child SA creation message used by the PDN GW or ePDG gateway for DL traffic.

Accordingly, the network-side end of the cipher tunnel can provide the providing the policy information to the UE at the same time as, and/or via the same mechanism used for establishing the cipher tunnel. By receiving the policy information in-band, the UE can efficiently obtain a mapping between traffic types and public markings, for example, between traffic filters and QoS markings. Therefore, intermediate network devices (which may not be privy to the contents of the ciphered channel) can effectively differentiate traffic based on the unencrypted markings in the outer IP header, provided by the UE.

FIG. 1 illustrates a wireless communication system 100 on which various aspects may be implemented. The system 100 includes a base station 102 that can include multiple antenna groups (not shown). The base station 102 can additionally include a transmitter chain and a receiver chain, each of which can in turn include a plurality of components associated with signal transmission and reception (e.g., processors, modulators, multiplexers, demodulators, demultiplexers, antennas, etc.), as will be appreciated by a person having ordinary skill in the art. The base station 102 can communicate with one or more access terminals such as an access terminal 104; however, it is to be appreciated that the base station 102 can communicate with substantially any number of access terminals similar to access terminal (or UE) 104.

Examples of UEs can include any of cellular phones, smart phones, laptops, handheld communication devices, handheld computing/entertainment devices, satellite radios, global positioning systems, PDAs, and/or any other suitable device for communicating over the wireless communication system 100. In the illustrated embodiment, the UE 104 is in communication with the base station 102, which transmits information to the UE 104 over a forward link 112 and receives information from the UE 104 over a reverse link 114. The base station accesses various resources 106 to provide the UE 104 with requested services 108.

In accordance with various aspects, the resources 106 can belong to a network in an area visited by the UE, such as a VPLMN (Visitor Public Land Mobile Network) or may be within the HPLMN (Home Public Land Mobile Network) of the UE 104. Based on the type of service request, appropriate resources 106 for different user-user or user-network services are configured. For example, an FTP (File Transfer Protocol) server within the resources 106 can provide FTP service. Similarly, a HTTP (Hyper Text Transfer Protocol) server can provide World Wide Web service, and another operator can provide DNS service via another server. Additionally, the resources 106 facilitate implementation of charging rules and policies for different service data flows (SDF) arising from these service requests.

The system 100 can also employ various coding/ciphering schemes for encrypting the data flow amongst the various network elements. Various nodes within the system 100 can be configured with different levels of access to the data. As a result, it can be problematic to implement the specific QoS rules for each of the different data flows at every step within the network. For example, the UE 104, which is at one end of a cipher tunnel, and the resources 106, which are at the other end of the cipher tunnel, can view data packets within the cipher tunnel. However, when encrypted, the packets may not be similarly accessible to the access functions associated with the base station 102, which facilitates transfer of the data packets therebetween. As a result, it may be difficult to implement the precise charging policies or quality considerations at such points. Additionally, it may enhance security of the system 100 if transit entities within the system 100 can forward the payload without having to investigate the data packets within the cipher tunnel. According to the various aspects described herein, the system 100 facilitates data access such that the flow-specific rules such as charging rules or QoS rules for different data flows can be applied uniformly at various network nodes upon inspection of packet headers regardless of the transparency of the data packets within the various flows to the different network nodes.

Figure 2:
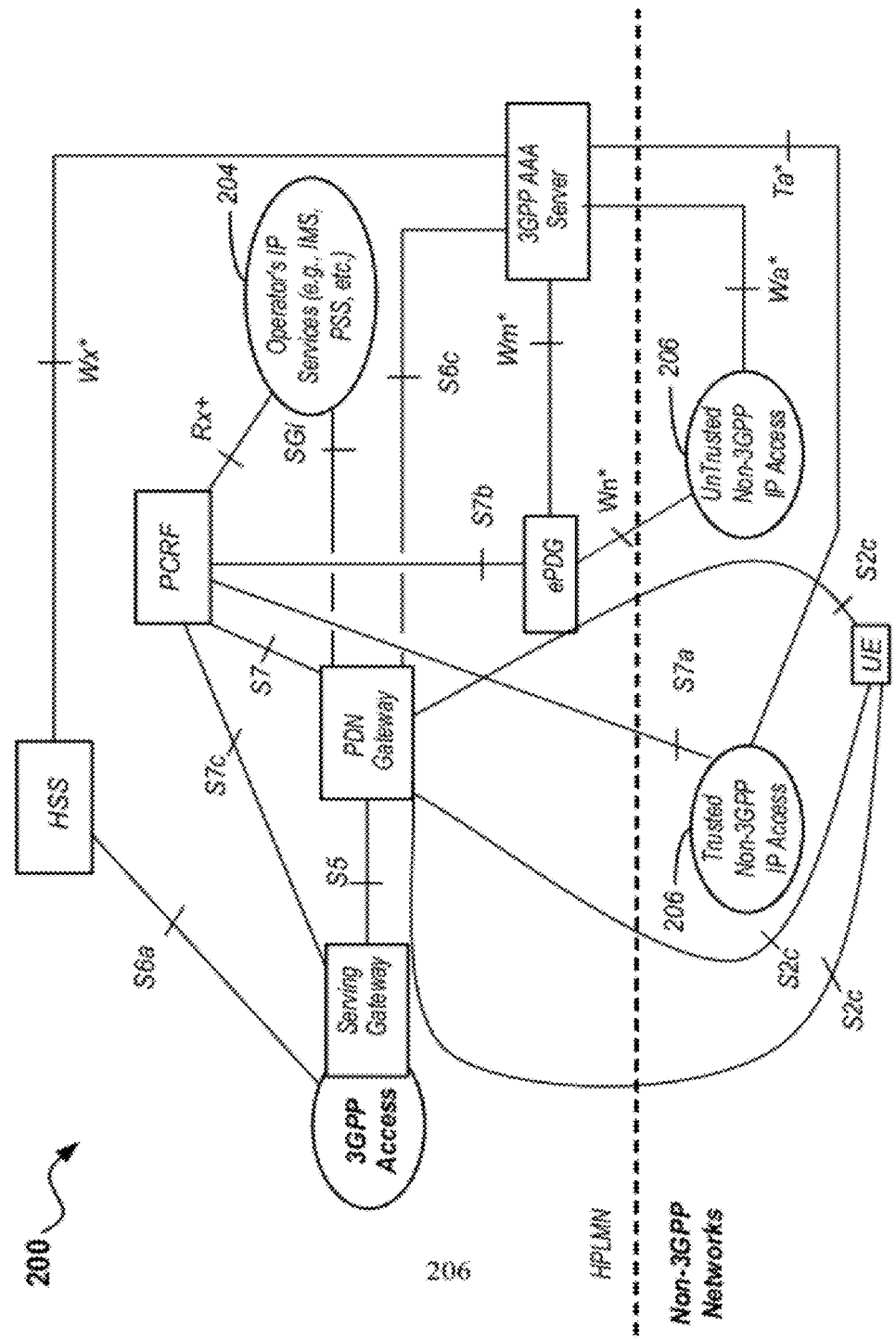
FIG. 2 illustrates a reference architecture of a 3GPP-LTE system in accordance with aspects.

FIG. 2 illustrates a reference architecture of a 3GPP-LTE system 200 in accordance with aspects. For clarity, various functional/logical nodes within the system 200 are shown as separate entities. It will be appreciated, however, that one physical network element can implement a plurality of these functional/logical nodes. The system 200 facilitates access to various services 204 by the UE 202 via different gateways. For example, the UE 202 can access the Internet or other operator IP services 204 via one of a trusted non-3GPP IP access interface such as Wi-Fi, WiMAX or an untrusted non-3GPP IP access commonly labeled in the figure as 206.

The UE 202 communicates with the access system via two types of IP (Internet Protocol) Gateway logical functions for the user plane, the Serving Gateway and the Packet Data Network Gateway (PDN-GW), via S2c interfaces. These network functions can be implemented in the same or disparate physical nodes such that Serving Gateways of a VPLMN serving the UE 202 can connect to PDN-GWs of other networks which direct the traffic from the UE 202 to various services 204. Additionally, the Serving GW communicates with the HSS (Home Subscriber Server) via the S6a interface while the HSS is in turn connected to a 3GPP AAA (Authentication Authorization and Accounting) server via a Wx* interface. The 3GPP AAA server also communicates with other network entities such as ePDG, non 3GPP access mechanisms 206, and PDN-GW via Wm*, Wa*, Ta*, and S6c interfaces respectively. The PDN-GW communicates with a Serving Gateway and IP Services via S5 and SGi interfaces, respectively.

As described previously, the UE 202 can faciliatate various data flows. Some flows can be user data generated at the UE 202 while other flows can relate to data received by the UE 202, which should be forwarded further to another network element. For example, one flow can facilitate browsing the Internet, while another flow can facilitate VoIP (Voice over Internet Protocol) services. By way of illustration and not limitation, unidirectional flow of IP packets with the same source IP address and the same destination IP address and the same transport protocol can be referred to as an IP flow.

The IP flows can be encapsulated and transported across various networks via communication channels that can be referred to as IP tunnels. Additionally, each of these flows can be associated with specific rules to be implemented such as, for example, QoS considerations or rules for charging a subscriber for services rendered associated therewith. In accordance with further aspects, these rules can be predetermined or they can be determined dynamically. For example, the QoS considerations can depend on the type of data being generated or type of service plan associated with the UE 202. In an embodiment, these rules are determined by a PCRF (Policy and Charging Rules Function) and communicated to the various network elements via the different S7 network interfaces connecting the PCRF to the trusted/untrusted network access mechanisms, the PDN-GW and the Serving Gateway etc., as shown in FIG. 2.

In a further aspect, the PCRF communicates the rules to the BBERF (Bearer Binding and Event Reporting Function) present within each of these network elements associated with the S7 interfaces (not shown). The rules can include a description of an IP flow, which can be identified by a filter, the source of the flow, for example, the IP address from which the flow originates, the destination of the flow, the protocol to be used with the flow, the description of the data within the flow and a methodology of treatment of the data etc. can all be determined at the PCRF associated with a HPLMN of the UE 202.

In embodiments where Mobile IPv4 (MIP) or Dual Stack Mobile IPv6 (DSMIPv6) protocols are used for the communication between the UE 202 and the PDN-GW as shown in FIG. 2, a tunnel is established therebetween for communication of the data packets. This tunnel proceeds through the non-3GPP access mechanism as shown in FIG. 2. In particular, depending on whether a trusted non-3GPP access mechanism or a untrusted, non-3GPP, access mechanism is used, one of the S7a interface or the S7b interface through the Evolved Packet Data Gateway (ePDG) is used for communication of the data packets. Accordingly, the access mechanism detects the type of data packets within the tunnel, and confers with the PCRF to receive the appropriate treatment to be applied for the data packets. As mentioned previously, the system 200 can be enhanced if the access mechanism can identify the appropriate QoS treatment for the packets upon inspection of the packet headers. Moreover, if the data flow within the tunnel is ciphered or encrypted, the flow would not be transparent to the BBERF within the access mechanism. Hence, the access mechanism cannot collaborate with the PCRF to provide flow-specific rules, for example, a desired QoS treatment for the data packets within the tunnel.

In a further aspect, whenever payload is tunneled from the UE 202 to a Home Agent (not shown), an identifier is allocated to the IP flow by the PDN-GW. This is communicated within a header associated with the data packets to at least a subset of the network elements. This facilitates, for example, the PCRF to determine the appropriate flow-specific rules to be employed for the encrypted packets and communicate such rules to the non-3GPP access mechanism. The access mechanism can match the rules to the specific IP flows via the flow identifiers, thereby facilitating operation of the communication system 200. Upon termination of an encrypted session, the system 200 can return to communication of the policy rules via the S7 interfaces, whereby the access mechanism confers with the PCRF based on a sampling of the data packets within the flows. Thus, instead of implementing a methodology that requires an access mechanism to have knowledge of the nature of data packets within the IP flows, various aspects relate to providing identification information in the form of a label, a pointer, and/or an identifier for the IP flows, including a tuple of IPv6 fields including a source address and a DSCP (Differentiated Services Code Point), as well as transport layer port numbers (when User Datagram Protocol (UDP) tunneling is used) within the payload header. This facilitates implementation of the correct flow specific rules where the nature of the data packets within the flows remains unknown.

In a further aspect, a source address can be used in addition to the flow ID to identify specific data flows. Thus, for a given source, the combination of flow ID and source address is unique. This facilitates the UE 202 to receive flows with the same flow ID from different sources or disparate PDN-GWs. For example, the UE 202 can receive flows with the same flow IDs originating from its own Internet service access or access to VoIP service, since the combination of source address and flow ID would be unique.

In another aspect, the flow identification information can be utilized to verify if the UE 202 has used the correct policies/rules for the appropriate data packets on uplink communications. As discussed previously, the data packets within a flow may not be transparent to the access mechanisms 206. Therefore, while the PDN-GW may be able to identify whether the correct policy has been applied to the flows it has received from the appropriate access mechanism 206, it may not be able to determine whether the same is true for flows between the UE 202 and the access mechanism 206. For example, the UE may apply the wrong QoS categories to the data packets while communicating with the access mechanism 206. In an embodiment, the impact of this incorrect QoS application can be mitigated by the use of the flow identification as described herein. In an embodiment, the UE 202 can receive flow identification information from the PDN-GW. In another embodiment, the UE 202 can generate flow IDs for specific mobile originated data flows. In an embodiment, the UE 202 can place the data packets in the appropriate QoS pipes based on the flow ID. When the PDN-GW receives the labeled flows from the UE 202 via the access mechanism 206, it can employ the flow IDs to verify that the UE 202 has applied the correct QoS rules for the data flows. In a further aspect, the flow ID can be a 8-bit or 16-bit value within outer IP-header for labeling specific data flows.

In another embodiment, the access mechanism 206 or the Serving Gateway can include the flow identification information with uplink data packets. In this aspect, the UE 202 transmits the data flows to the access mechanism 206 through one or more QoS pipes in accordance with applicable rules. The access mechanism 206 (e.g., a Serving GW) has information regarding particular flow identification information associated with respective QoS pipes utilized by the UE 202 for the data flow (based on the policy it has received from policy server). The access mechanism 206 can then append flow identification information such as flow labels and the like to an outer header of the data packet and transmit the packets to the PDN-GW or a Home Agent. The PDN-GW, upon receiving the data flows in addition to the flow identification information, can compare the flow identification information received from the access mechanism 206 (e.g., Serving GW) to the flow identification information associated with policies of the data flows, as determined and communicated to it by the PCRF. Thus, the PDN-GW can verify that the data flows were transmitted by the UE 202 to the access mechanism 206 (e.g., Serving GW) in accordance with flow-specific policies, as determined by the PCRF. Accordingly, labeling or identifying data flows can not only facilitate uniform application of charging/QoS rules, it can also provide a verification mechanism for determining that a UE has applied the correct rules to each data flow.

Figure 3:
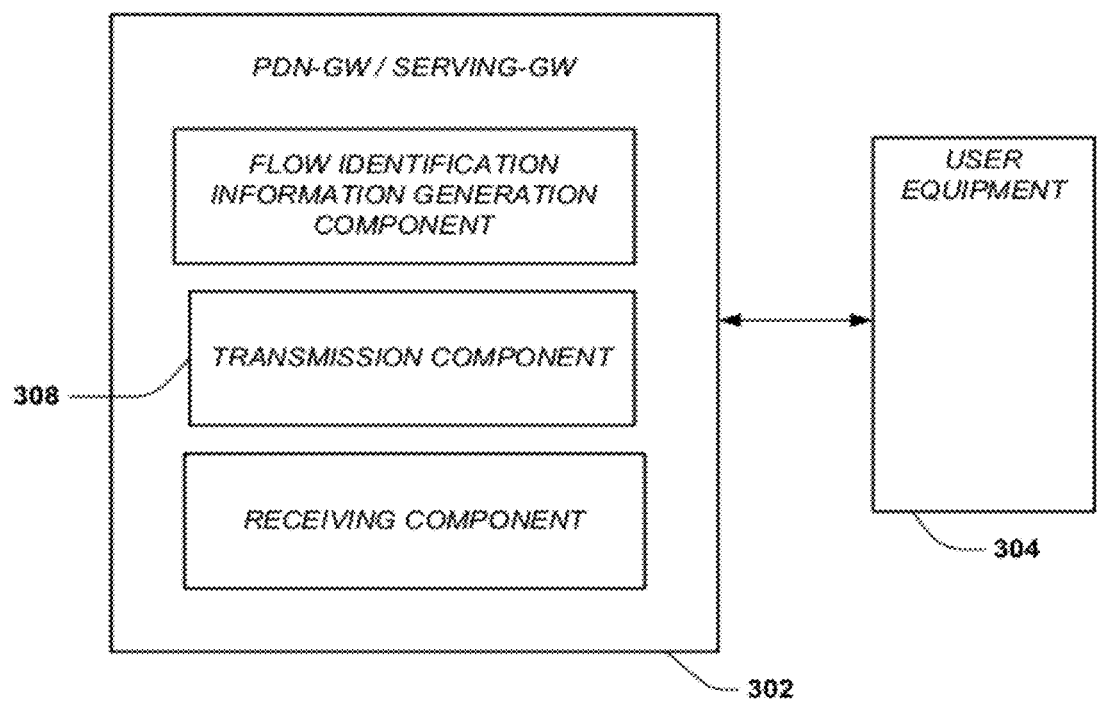
FIG. 3 illustrates an access network element and a corresponding UE, according to an embodiment.

FIG. 3 illustrates an access network element 302 and a corresponding UE 304, according to an embodiment. The illustrated access network element 302 and UE 304 can facilitate tunneling in accordance with aspects described herein. As discussed previously, the various functional/logical entities that facilitate ciphering support within a network such as the PCRF, PDN-GW, Serving GW (Serving Gateway), or the BBERF can be implemented by the same or disparate physical elements of the network. Accordingly, the physical element 302 within the network that implements the PDN-GW and/or the Serving GW can include a flow identification information generation component 306 in addition to a transmission component 308 and a receiving component 310.

In an embodiment, the receiving component 310 can receive one or more data flows. In another embodiment, the receiving component 310 can receive an indication from another network element, such as a policy server, that one or more data flows are to be received. Upon receiving such communication, the flow ID generation component 306 associated with the physical element 302 can be employed to generate a label/pointer/flow ID for each of the IP flows. In accordance with one aspect, the flow identification information generation component 306 can start labeling data flows when the UE 304 and the physical element 302 turn on encryption/ciphering for particular flows. For simplicity, the UE 304 is shown to be communicating with a single physical element 302. It will be understood, however, that the UE 304 can communicate with a plurality of PDN-GWs for access to different types of services as detailed herein. For example, a combination of HA (Home Agent) address assigning the flow identification information can be used along with the flow identification information to uniquely identify each of the plurality of flows associating the UE 304 with the plurality of PDN-GWs. The transmission component 308 can communicate the generated flow identification information to a policy server (not shown) executing the PCRF that determines the QoS rules to be implemented for the flow associated with the generated flow identification information. The policy server can then communicate the flow identification information along with the QoS rules to an access mechanism such as a trusted/non-trusted 3GPP mechanism as detailed above for implementation.

Figure 4:
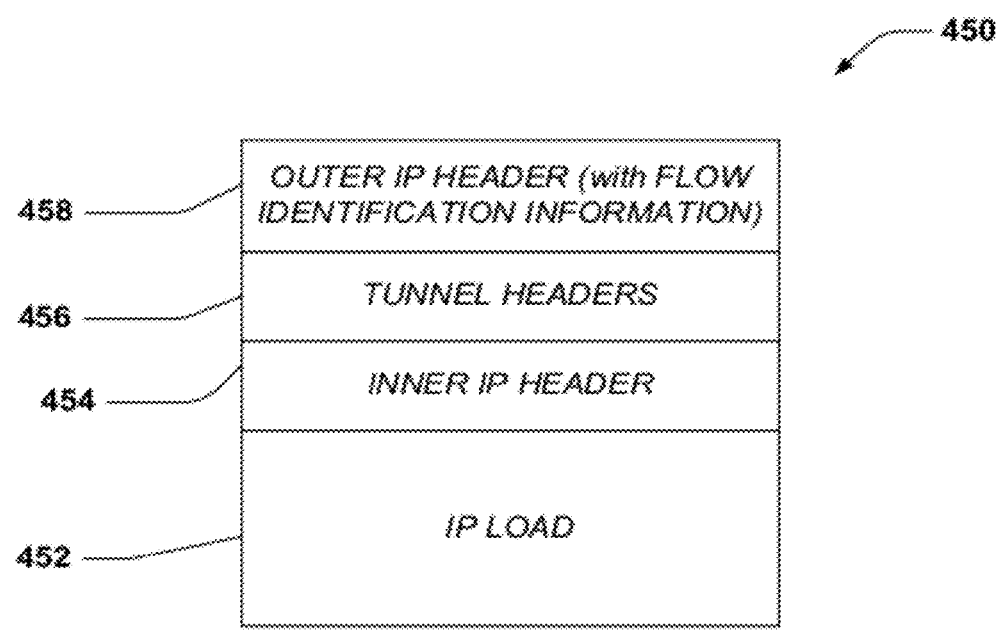
FIG. 4 is a schematic diagram of an IP payload according to an embodiment.

FIG. 4 is a schematic diagram of an IP payload 450 according to an embodiment. The IP payload 450 can be transmitted in a communication tunnel along with flow identification information. In an embodiment, when a payload is transmitted from a UE to a Home Agent or vice versa, a native routing path via an IP tunnel is established across the intermediate network. IP tunnels may be used to connect, for example, IPv6 implementations with IPv4 implementations. In IP tunneling, each IP payload 452 is configured with information regarding the original source and recipient in the inner IP header 454, The outer IP header 458 comprises source and destination information identifying the "endpoints" of the tunnel. Other intermediate tunnel headers 456 may optionally be included based on, for example, the communication protocols being used etc. The intermediate tunnel headers 456 can facilitate forwarding the payload. At the tunnel end points, packets traversing the end-points from the transit network are stripped from their transit headers and trailers used in the tunneling protocol and converted into native protocol format and injected into a network stack. In a more detailed aspect, the flow identification information in the form of flow labels, pointers or flow IDs can be included in the outer IP header 458, as shown. The flow identification information can allow the PCRF and eventually the BBERF to identify a tunnel flow by inspecting the outer header 458.

Figure 5:
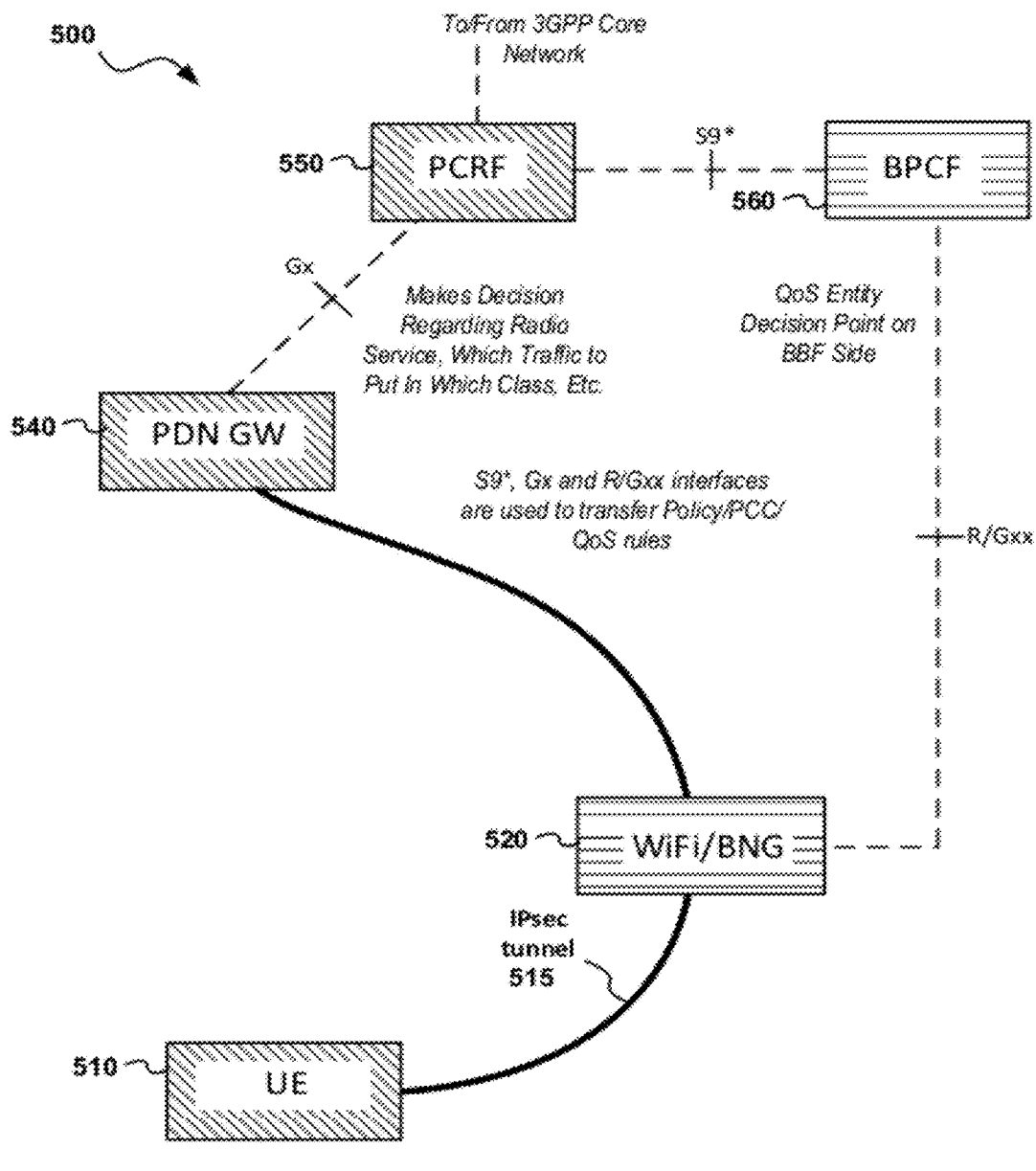
FIG. 5 illustrates one example embodiment of a communication system including tunneling.

FIG. 5 illustrates one example embodiment of a communication system 500 including tunneling. System 500 includes one or more terminals or UEs 510, which are connected to a 3GPP network through a packet data network (PDN) gateway (GW) 540. The connection includes a path through a non-3GPP entity, such as WiFi Border Node Gateway (BNG) 520. An Internet Protocol Security (IPsec) tunnel 515, which is a protocol mechanism for securing IP communications by authenticating and encrypting each IP packet of a communication session, may be established between the UE 510 and PDN GW 540. The BNG 520 provides an enforcement function such that when UE 510 connects to the 3GPP core through PDN GS 540, traffic is properly classified. In particular, the BNG 520 classifies traffic into proper classes and provides QoS differentiation based on information provided by a Bearer Path Control Function (BPCF) node 560. The BPCF node 560 can receive the information from a Policy Charging and Rules Function (PCRF) node 550. The PCRF node 550 can be coupled to the PDN GW 540. The BPCF 560 informs the BNG 520 to provide or enforce a QoS that is decided in the 3GPP core network.

Figure 6:
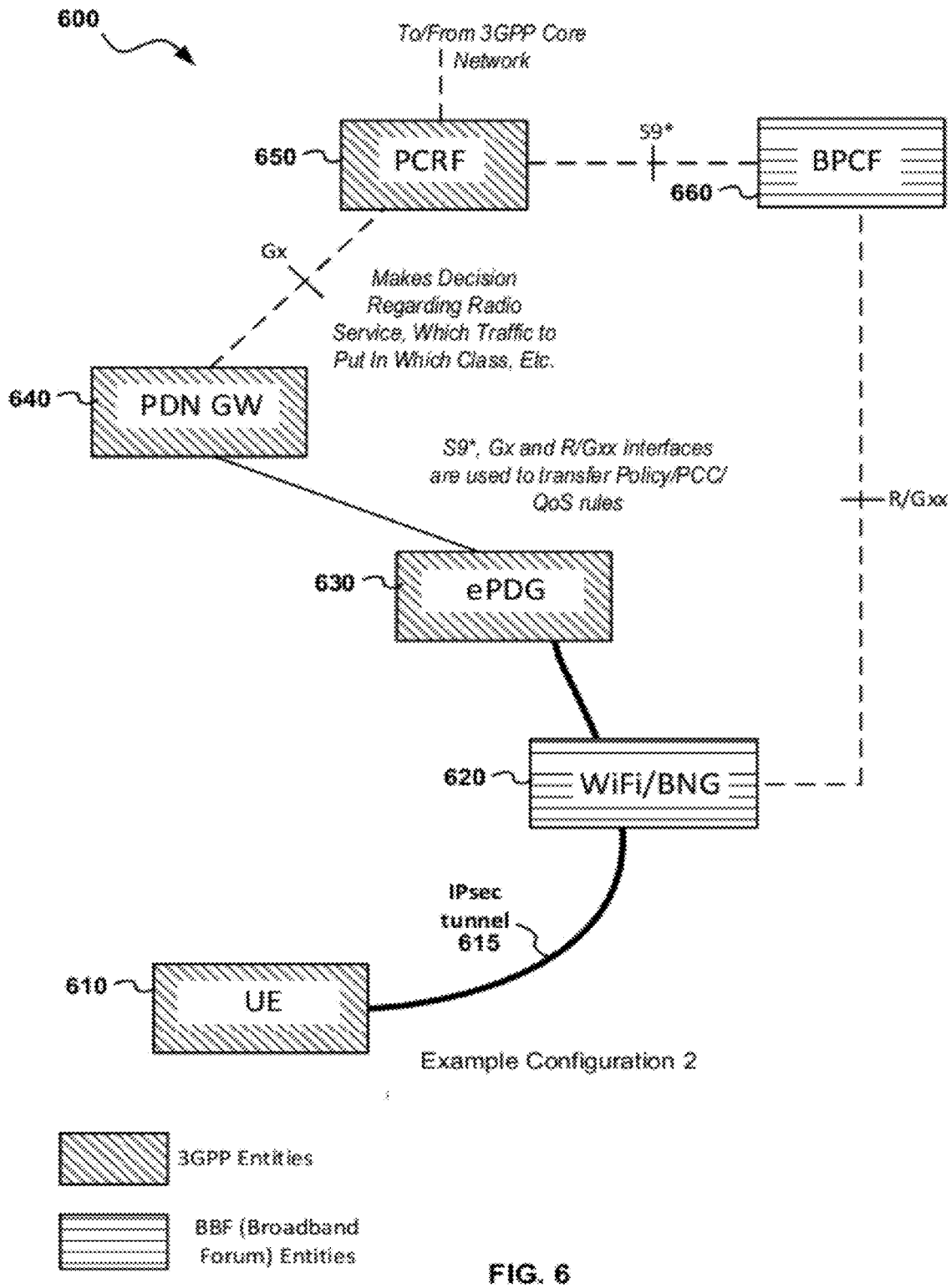
FIG. 6 illustrates another example embodiment of a communication system including tunneling.

FIG. 6 illustrates another example embodiment of a communication system 600 including tunneling. The example of FIG. 6 is similar to that of FIG. 5. In the embodiment illustrated in FIG. 6, however, an enhanced Packet Data Gateway (ePDG) 630 is coupled to UE 610, and an IPsec tunnel 615 is established between UE 610 and ePDG 630 via BNG 620. In this example, ePDG 630 is coupled to PDG GW 640, which is coupled to PCRF 650. PCRF 650 makes decisions regarding radio services, traffic classifications, etc., and provided information to BPCF 660, which then informs BNG 620 to provide or enforce a QoS that is decided in the 3GPP core network.

In accordance with various aspects, IKEv2 signaling may be used to establish an IPsec tunnel between a terminal or UE and a PDN GW or ePDG, as exemplified in FIGS. 5 and 6. The PDN GW or ePDG (such as PDN GW 540 or ePDG 630), may signal over IKEv2 one or more uplink (UL) traffic filters and/or Quality of Service (QoS) markers to the UE. Accordingly, the UE may receive instruction as to how it should mark packets. This may be done through, for example, IPsec tunnels 515 or 615. In addition, this information may also be provided to the BNG (such as BNGs 520 or 620), and the marked packets may be accordingly processed (in view of the encryption of the packets through IPsec tunnels 515 and 615).

Figure 7:
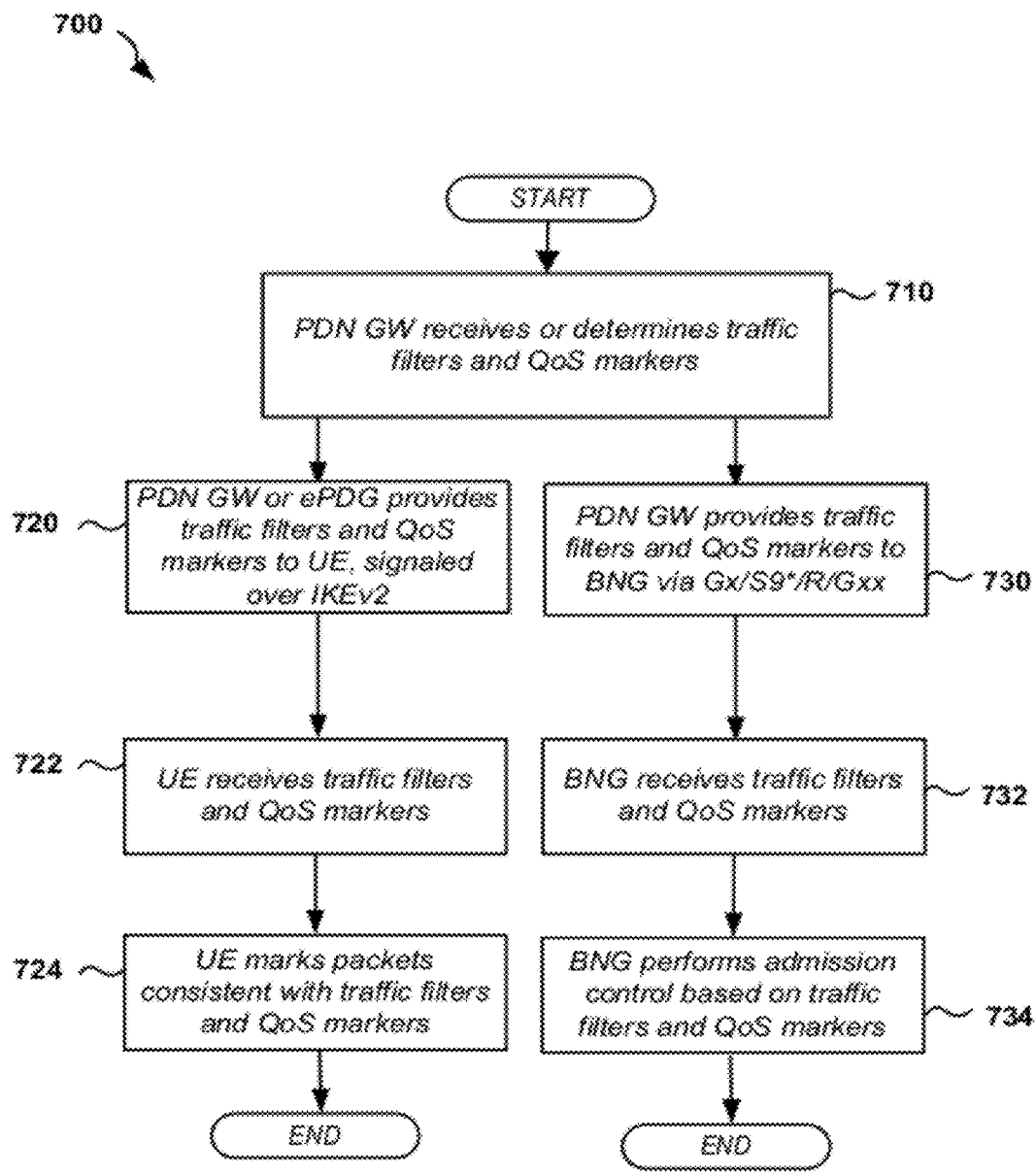
FIG. 7 illustrates an embodiment of a process of providing traffic filters and QoS markers.

FIG. 7 illustrates an embodiment of a process 700 of providing traffic filters and QoS markers. Although the method of process 700 is described herein with reference to the PDN 302 and UE 304 discussed above with respect to FIG. 3, a person having ordinary skill in the art will appreciate that the method of flowchart 700 may be implemented by any other suitable devices. Although the method of flowchart 700 is described herein with reference to a particular order, in various embodiments, blocks herein may be performed in a different order, or omitted, and additional blocks may be added.

First, at block 710, a PDN receives or determines traffic filters and QoS markers associated with flows through an IPsec tunnel, such as those shown in FIGS. 5 and 6. Next, at block 720, the PDN and/or ePDG provide the traffic filters and QoS markers to the UE, which may be signaled using IKEv2. Then, at block 722, the UE receives the traffic filters and QoS markers. Thereafter, at block 724, the UE may mark packets consistent with the traffic filters and QoS markers so they may be processed by a BNG in the IPsec tunnel. Subsequently, at block 730, the PDN provides the traffic filters and QoS markers to the BNG. This may be done through the connections Gx/S9*/R/Gxx as shown in FIGS. 5 and 6. Next, at block 732, the BNG receives the traffic filters and QoS markers. Then, at block 734, the BNG controls traffic in the IPsec tunnel based on the received policy information.

Figure 8:
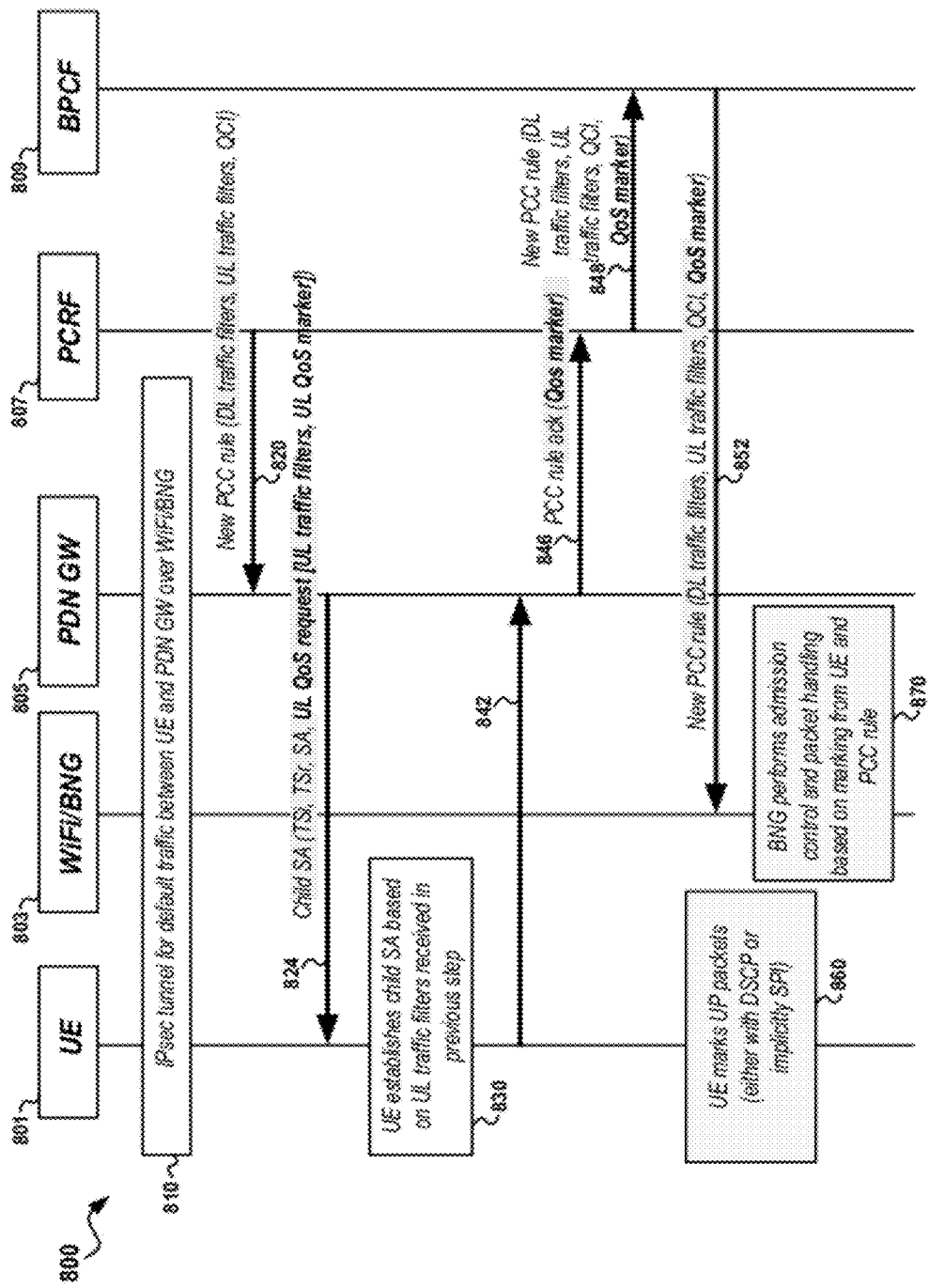
FIG. 8 illustrates an embodiment of an example call flow using tunneling.

FIG. 8 illustrates an embodiment of an example call flow 800 using tunneling. Entities UE 801, BNG 803, PDN GW 805, PCRF 807, and BPCF may correspond to similar entities as shown in FIGS. 5 and 6. First, the UE 801 and the PDN GW 805 may establish an IPsec tunnel 810 for default traffic. The PCRF 807 may transmit a new PCC rule to the PDN GW 805 via signaling 820. The PDN GW 805 may then generate a child service association (SA), which may be transmitted to the UE via signaling 824, such as described previously via IkeV2. The signaling 824 may include a UL QoS request, which may include UL traffic filters and UL QoS markers, such as described previously. The UE 801 may then establish a child SA at block 830, based on the UL traffic filters received via signaling 824. The UE 801 may then transmit the Child to the PDN GW 805 via signaling 842. The PDN GW 805 may then send a PCC rule acknowledgement to the PCRF 807 via signaling 846.

The PCRF 807 may then transmit the New PCC Rule to the BPCF 809 via signaling 848. In addition, the BPCF may transmit the new PCC Rule to the BNG 803 via signaling 852, such as described previously with respect to FIGS. 5 and 6. The UE 801 may mark packets at block 860 for transmission to the BNG via the IPsec tunnel, such as described previously with respect to FIGS. 5 and 6. Moreover, the BNG may perform admission control at block 870, based on the marking made by the UE 801 at stage 860 and the PCC rule received via signaling 852.

Figure 9:
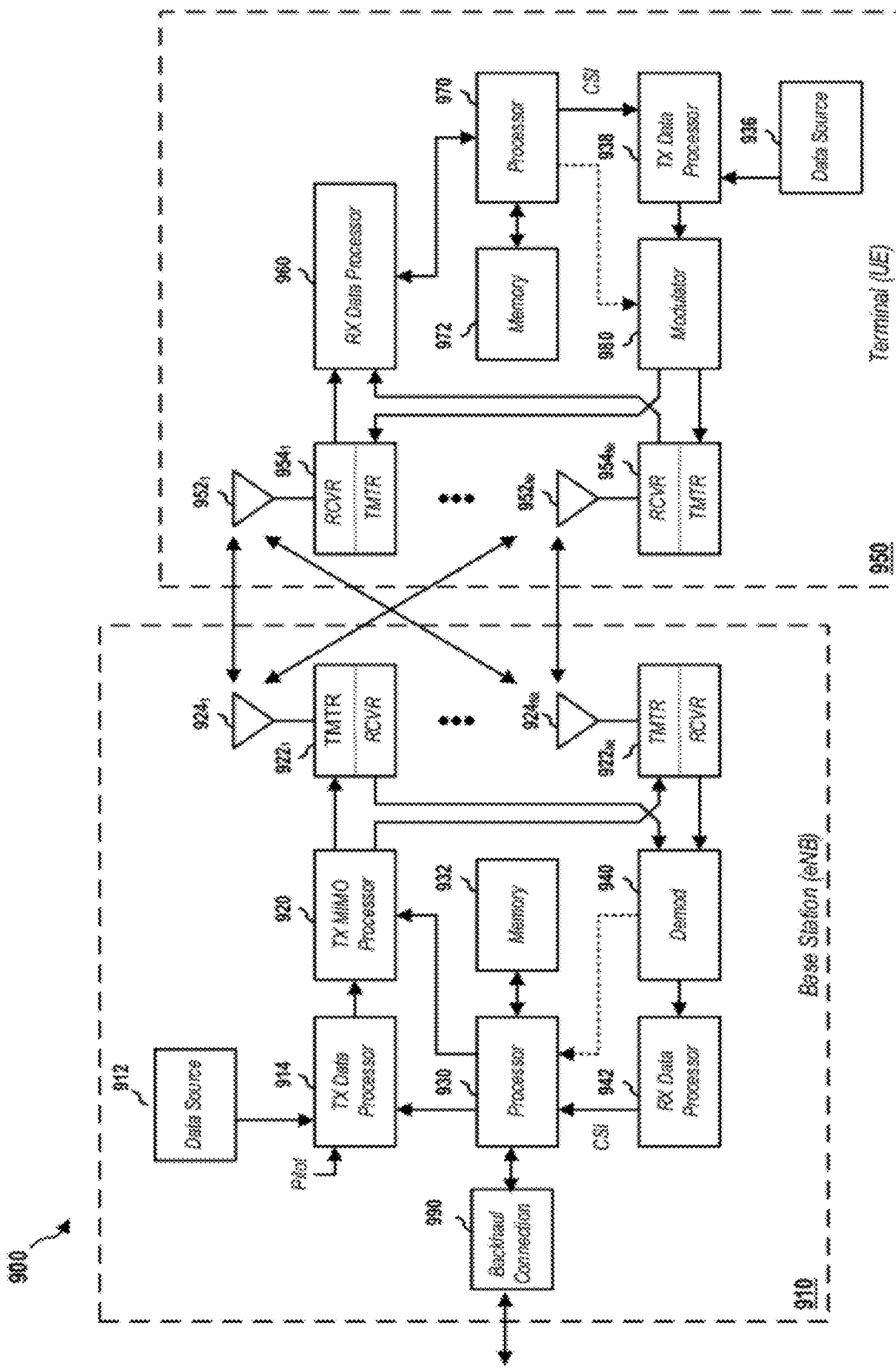
FIG. 9 illustrates an exemplary communication system including a terminal and a base station.

FIG. 9 illustrates an exemplary communication system 900, including a terminal and a base station. Various aspects described herein may be implemented on the communication system 900. For example, an access terminal 950 may be configured to receive traffic filters and QoS markers as described previously and mark packets accordingly. The wireless communication system 900 depicts one base station 910 and one access terminal 950 for sake of brevity. However, it will be appreciated that the system 900 can include more than one base station and/or more than one access terminal, and additional base stations and/or access terminals can be substantially similar or different from the example base station 910 and the access terminal 950 described below. In addition, it will be appreciated that the base station 910 and/or the access terminal 950 can employ the various systems, apparatus and/or methods described herein to facilitate wireless communications there between.

At the base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data can be a known data pattern that is processed in a known manner, and can be used at access terminal 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by the processor 930.

The modulation symbols for the data streams can be provided to a TX MIMO processor 920, which can further process the modulation symbols (e.g., for OFDM). A TX MIMO processor 920 then provides $N_t$ modulation symbol streams to $N_t$ transmitters (TMTR) $922_1$ through $922_{Nt}$. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_t$ modulated signals from transmitters $922_1$ through $922_{Nt}$ are transmitted from $N_t$ antennas $924_1$ through $924_{Nt}$, respectively.

At the access terminal 950, the transmitted modulated signals are received by $N_r$ antennas $952_1$ through $952_{Nr}$ and the received signal from each antenna 952 is provided to a respective receiver (RCVR) $954_1$ through $954_{Nr}$. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_r$ received symbol streams from $N_r$ receivers 954 based on a particular receiver processing technique to provide $N_t$ "detected" symbol streams. The RX data processor 960 can demodulate, deinterleave, and decode each detected symbol stream to recover the traffic data for the data stream. The processing by the RX data processor 960 is complementary to that performed by the TX MIMO processor 920 and the TX data processor 914 at the base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At the base station 910, the modulated signals from access terminal 950 are received by antennas 924, conditioned by receivers 922, demodulated by a demodulator 940, and processed by a RX data processor 942 to extract the reverse link message transmitted by access terminal 950. Further, the processor 930 can process the extracted message to determine which precoding matrix to use for determining the beamforming weights.

The processors 930 and 970 can direct (e.g., control, coordinate, manage, etc.) operation at the base station 910 and the access terminal 950, respectively. Respective processors 930 and 970 can be associated with the memory 932 and 972 that store program codes and data. The processors 930 and 970 can also perform computations to derive frequency and impulse response estimates for the uplink and downlink, respectively. The base station 910 may include a backhaul connection module 990, which may be used to provide connectivity from the base station to a core network and/or to other nodes, such as a PDN GW (now shown in FIG. 9), that provide connectivity to the core network.

Figure 10:
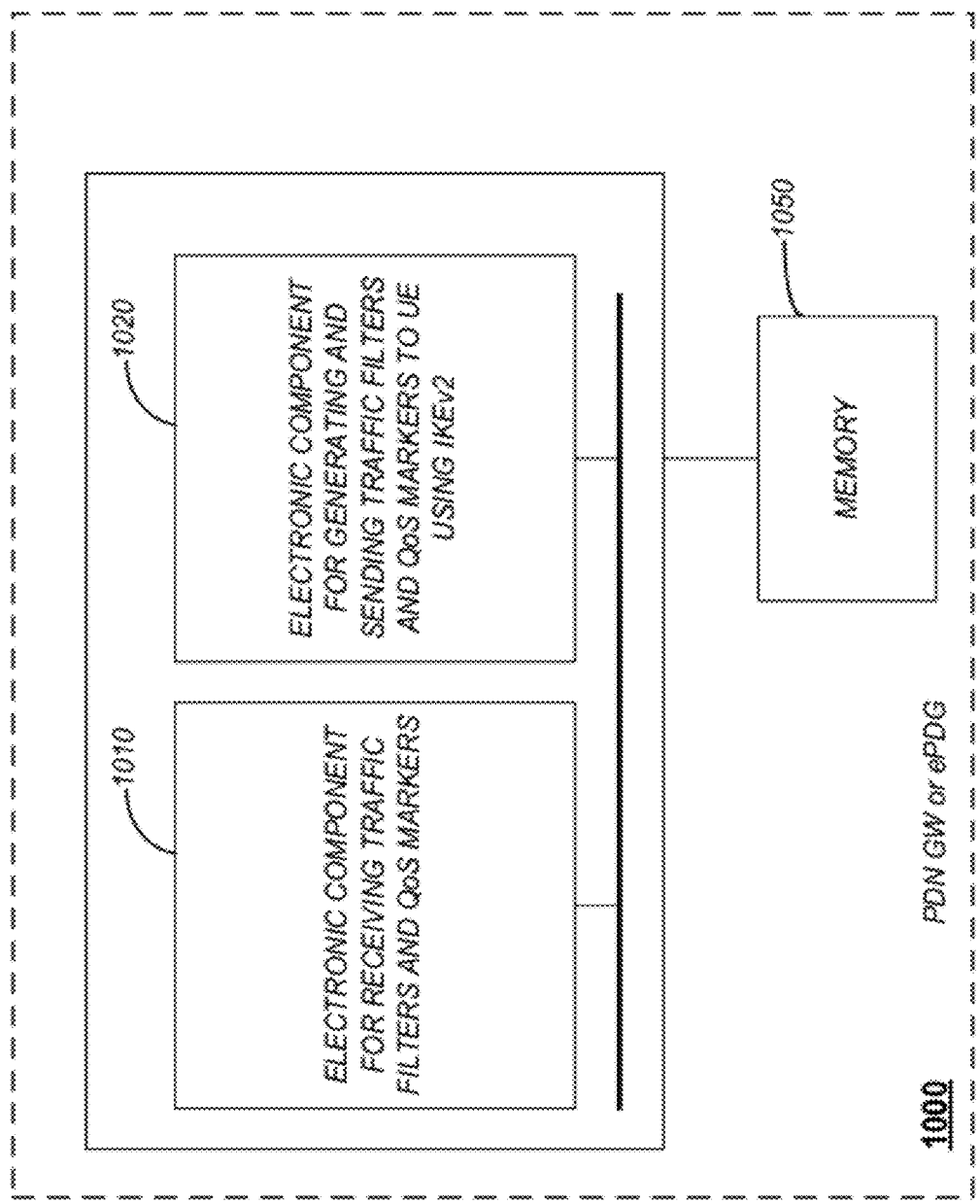
FIG. 10 illustrates an exemplary communications device.

FIG. 10 illustrates an exemplary communications device 1000. The device 1000 can provide various functionality as described herein, such as the functionality of a PDN GW or ePDG. The device 1000 may include an electronic component 1010 for receiving traffic filters and QoS markings or associated signaling, such as from a PCRF, such as described previously with respect to FIGS. 5, 6, and 8. The device 1000 may also include an electronic component 1020 for generating and sending the received traffic filters and QoS marking information, such as, for example, differentiated code pint (DSCP), IP precedence (i.e. Class of Service), or other marking mechanisms to a UE, such as described previously with respect to FIGS. 5, 6, and 8. The device 1000 may also include one or more memories 1050, which may comprise one or more physical memory or data storage devices, where the memory 1050 is configured to store received and processed data, instructions for execution on a computer to perform the functions described herein with respect to a PDN GW or ePDG, as well as other data or information. The device 1000 may also include other elements (not shown for clarity) such as processors, communication transmitters and receivers, other electronic, software, hardware or firmware components, or other components as known or developed in the art.

Figure 11:
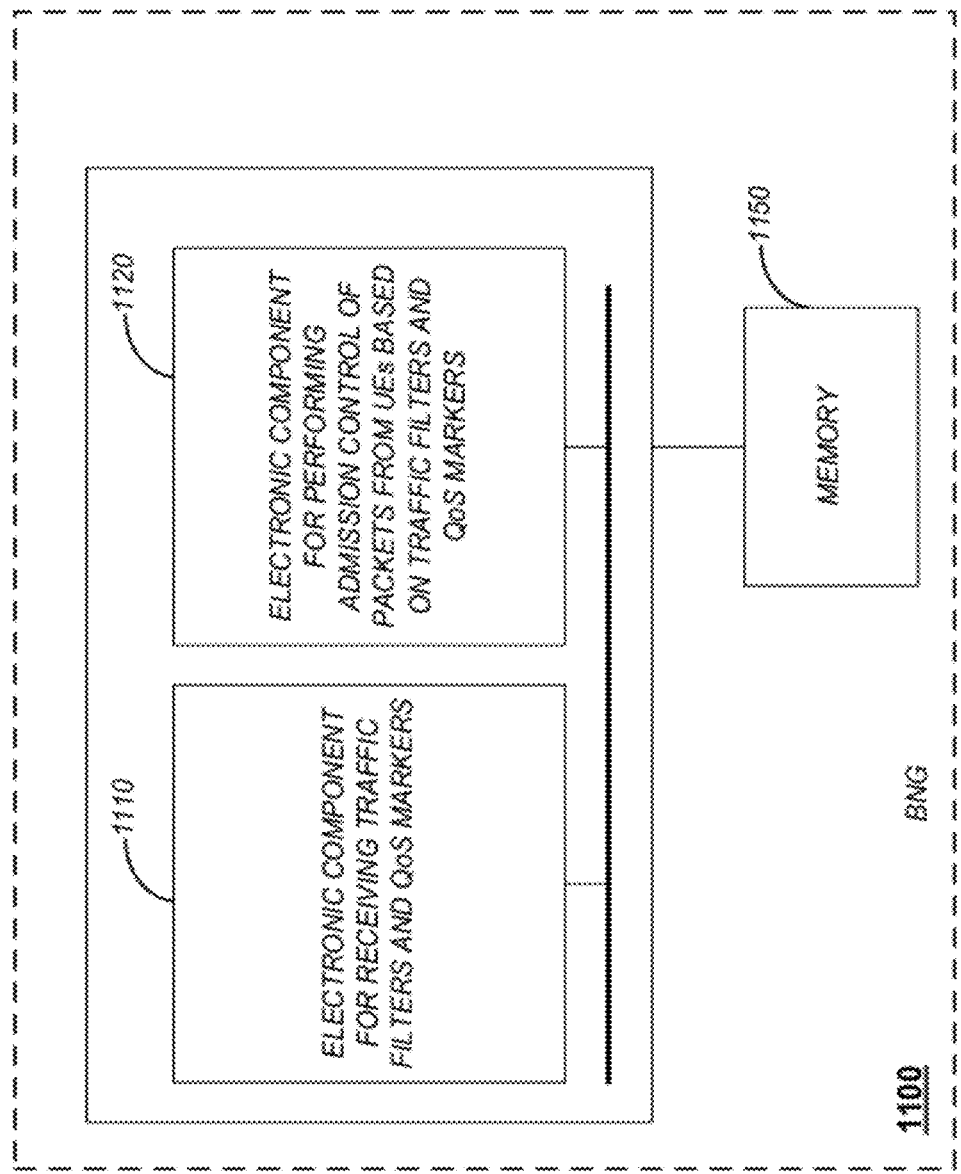
FIG. 11 illustrates another exemplary communications device.

FIG. 11 illustrates another exemplary communications device 1100. The device 1000 may provide various functionality as described herein, such as the functionality of a BNG, which may be a component of a wireless network such as a WiFi, WiMax, or other wired or wireless network. The device 1100 may include an electronic component 1110 for receiving traffic filters and QoS markings or associated signaling, such as from a BPCF, such as described previously with respect to FIGS. 5, 6, and 8. The device 1100 may also include an electronic component 1120 for processing packets received from a terminal or UE to provide admission control, such as described previously with respect to FIGS. 5, 6, and 8. The device 1100 may also include one or more memories 1150, which may comprise one or more physical memory or data storage devices, where the memory 1150 is configured to store received and processed data, instructions for execution on a computer to perform the functions described herein with respect to a BNG, as well as other data or information. The device 1100 may also include other elements (not shown for clarity) such as processors, communication transmitters and receivers, other electronic, software, hardware or firmware components, or other components as known or developed in the art.

Figure 12:
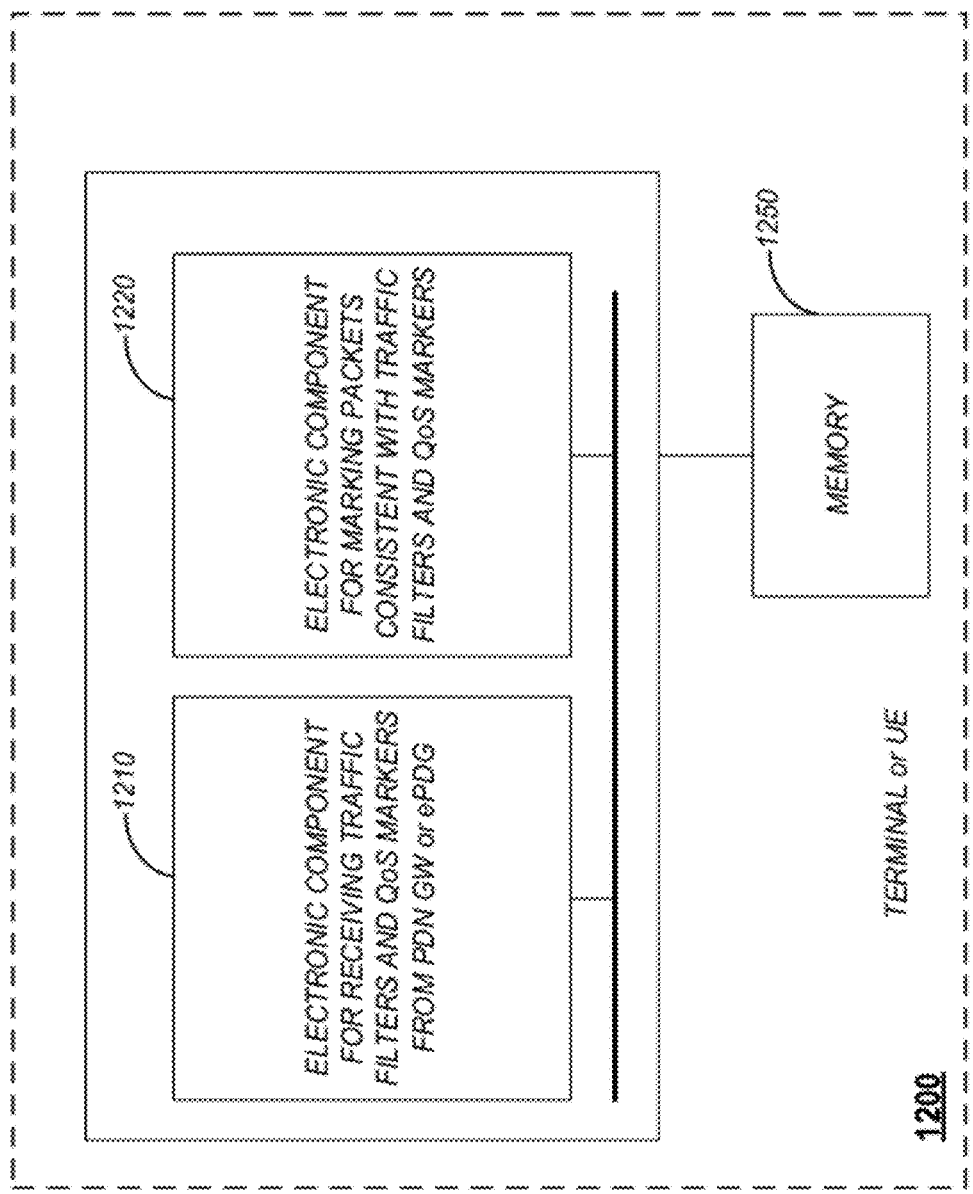
FIG. 12 illustrates another exemplary communications device.

FIG. 12 illustrates another exemplary communications device 1200. The device 1200 can provide various functionality as described herein, such as the functionality of a terminal or UE. The device 1200 may include an electronic component 1210 for receiving traffic filters and QoS markings or associated signaling, such as from a PDN GW or ePDG and associated base station or eNB, such as described previously with respect to FIGS. 5, 6, and 8. The device 1200 may also include an electronic component 1220 for marking packets based on the received traffic filters and QoS markings, such as described previously with respect to FIGS. 5, 6, and 8. The device 1200 may also include one or more memories 1250, which may comprise one or more physical memory or data storage devices, where the memory 1250 is configured to store received and processed data, instructions for execution on a computer to perform the functions described herein with respect to a terminal or UE, as well as other data or information. The device 1200 may also include other elements (not shown for clarity) such as processors, communication transmitters and receivers, other electronic, software, hardware or firmware components, or other components as known or developed in the art.

Figure 13:
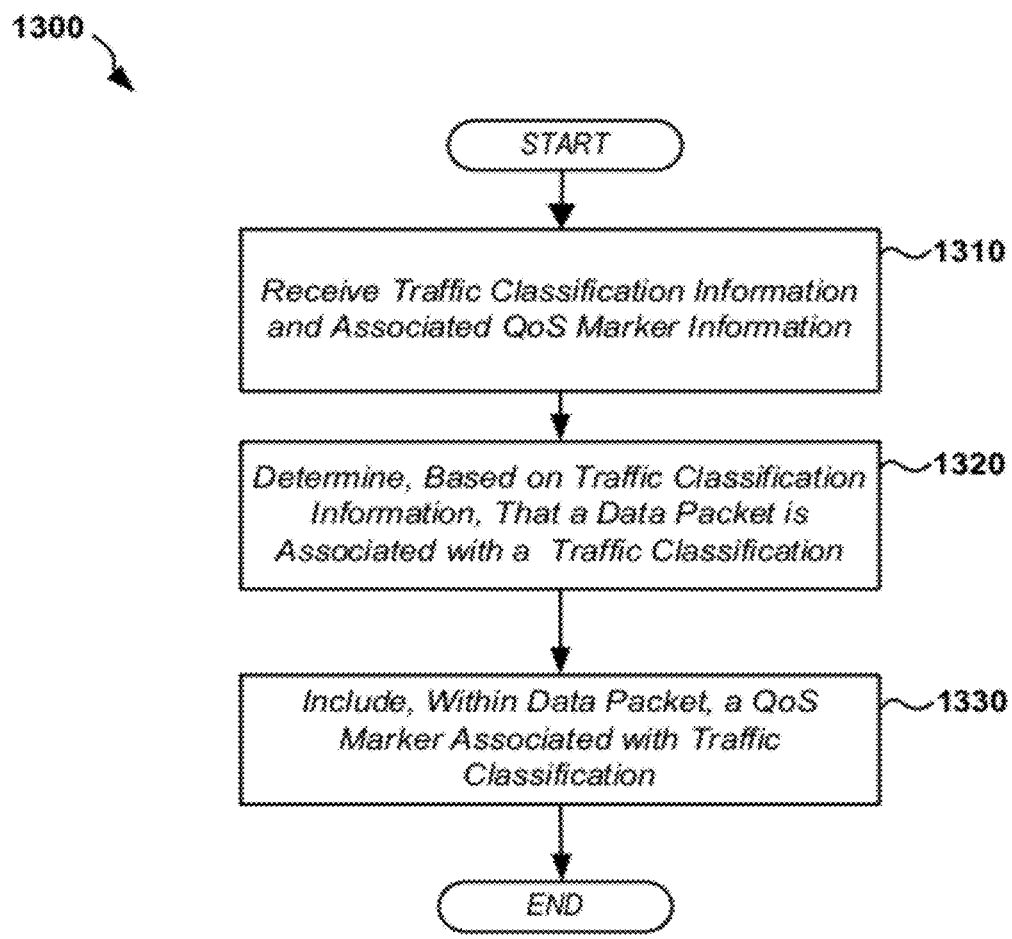
FIG. 13 illustrates an embodiment of a process for marking packets for transmission in a cipher tunnel.

FIG. 13 illustrates an embodiment of a process 1300 for marking packets for transmission in a cipher tunnel. The process 1300 can be implemented at, for example, a terminal or UE, where the processing may be based on information received from a PDN GW or ePDG, such as is shown in FIGS. 5, 6, and 8. Although the method of process 1300 is described herein with reference to entities of FIGS. 5, 6, and 8, a person having ordinary skill in the art will appreciate that the method of flowchart 1300 may be implemented by any other suitable devices. Although the method of flowchart 1300 is described herein with reference to a particular order, in various embodiments, blocks herein may be performed in a different order, or omitted, and additional blocks may be added.

First, at block 1310, the UE 610 receives traffic classification information and/or associated QoS marking information. Next, at block 1320, the UE 610 determines, based on the received information, that a data packet is associated with a particular traffic classification. Then, at block 1330, the UE 610 includes a QoS marker within the data packet. The QoS marker may be associated with a traffic classification. The QoS marker may allow a connected device, such as a BNG, to perform admission control on the packet upon receipt.

The process 1300 may include providing the QoS marker within a header of the data packet. In addition, the process 1300 may also include at least partially ciphering the data packet and transmitting the data packet. The at least partially ciphering may include ciphering a payload of the data packet, and the including may further comprise including the QoS marker within a header of the data packet. The header may be an IP header of the data packet. The header may be an IPsec header of the data packet. The receiving may include receiving the QoS marker information over a tunneled communication path. The traffic classification information may include one or more source addresses, DSCP value or port numbers. The QoS marker may comprise a DSCP value. The QoS marker may comprises a flow label value. The QoS marker may comprise an SPI value. The cipher tunnel may be established using Internet Key Encryption version 2 (IKEv2).

Figure 14:
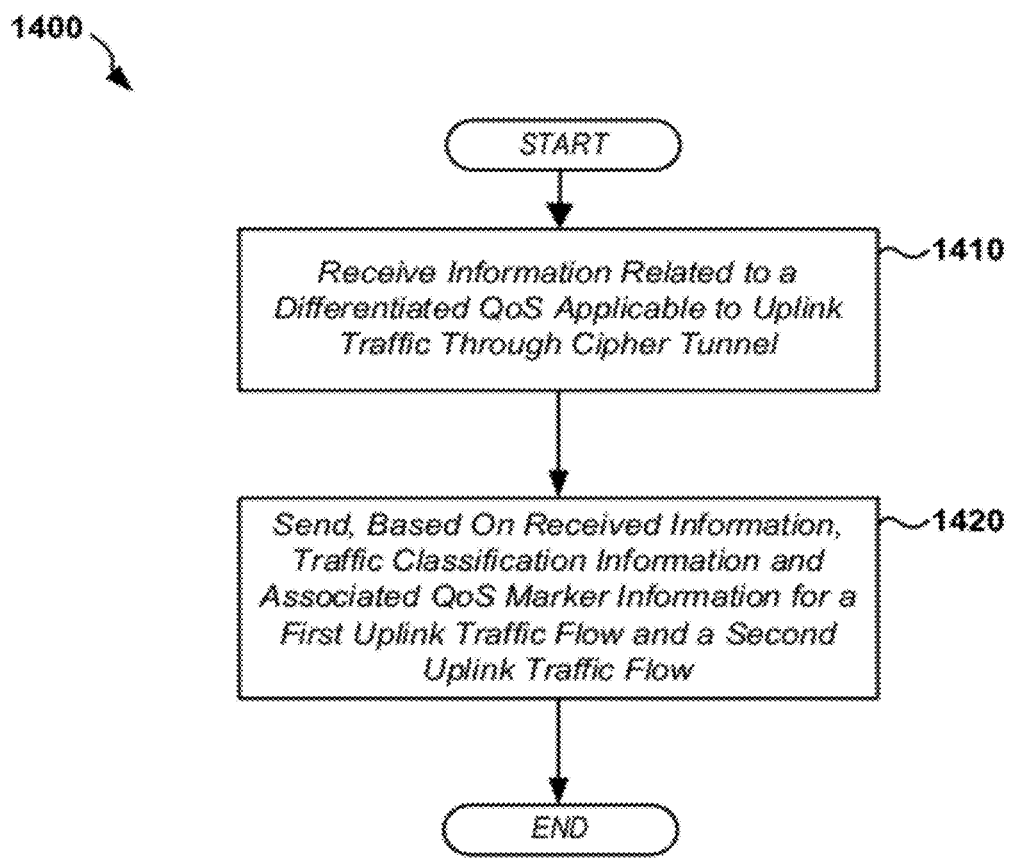
FIG. 14 illustrates an embodiment of a process for providing traffic classification information.

FIG. 14 illustrates an embodiment of a process 1400 for providing traffic classification information. The process 1400 can be implemented by, for example, a PDN GW or ePDG to a terminal or UE, such as, for example, is shown in FIGS. 5, 6, and 8. Although the method of process 1400 is described herein with reference to entities of FIGS. 5, 6, and 8, a person having ordinary skill in the art will appreciate that the method of flowchart 1400 may be implemented by any other suitable devices. Although the method of flowchart 1400 is described herein with reference to a particular order, in various embodiments, blocks herein may be performed in a different order, or omitted, and additional blocks may be added.

First, at block 1410, information may be received related to a differentiated QoS which may be applicable to uplink traffic through a cipher tunnel, such as is shown in FIGS. 5 and 6. Next, at block 1420, traffic classification information and associated QoS marker information may be sent to a terminal or UE. The information may be for a first uplink traffic flow and a second uplink traffic flow based upon the received information, and may be sent using signaling involved in establishing the cipher tunnel.

In an embodiment, the traffic classification information and associated QoS marker information may pertain to a first security association corresponding to the first uplink traffic flow and may pertain to a second security association corresponding to the second uplink traffic flow.

In some configurations, the apparatus for wireless communication includes means for performing various functions as described herein. In one aspect, the aforementioned means may be a processor or processors and associated memory in which embodiments reside, such as are shown in FIGS. 9 through 12, and which are configured to perform the functions recited by the aforementioned means. The may be, for example, modules or apparatus residing in UEs, eNBs, interworking gateways or other network nodes such as are shown in FIGS. 6-12 to provide the functions described herein. In another aspect, the aforementioned means may be a module or any apparatus configured to perform the functions recited by the aforementioned means.

Figure 15:
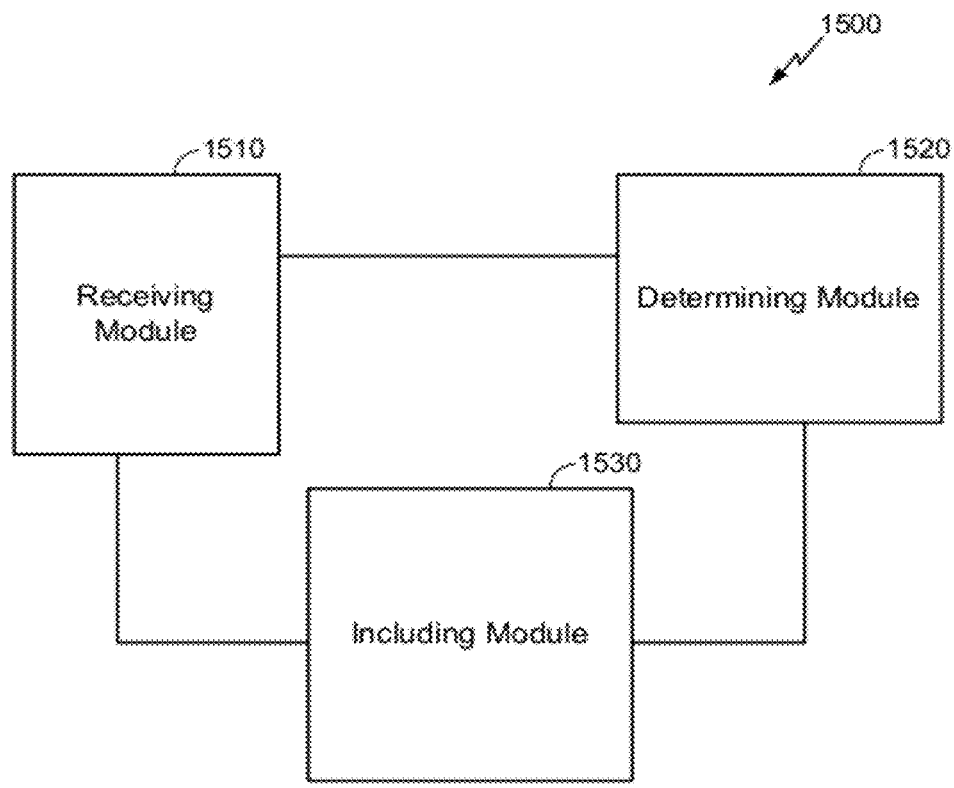
FIG. 15 is a functional block diagram of an exemplary wireless device that may be employed within the wireless communication system of FIG. 1.

FIG. 15 is a functional block diagram of an exemplary wireless device 1500 that may be employed within the wireless communication system of FIG. 1. The device 1500 includes a receiving module 1510. The receiving module 1510 may be configured to perform one or more of the functions discussed above with respect to the block 1310 illustrated in FIG. 13. For example, the receiving module may be configured to receive traffic classification information and associated QoS marker information. In various embodiments, the receiving module 1510 may include one or more of the receiver 922, the receiver 952, the backhaul connection 990, the RX data processor 942, and the RX data processor 960 (FIG. 9).

The device 1500 further includes a determining module 1520. The determining module 1520 may be configured to perform one or more of the functions discussed above with respect to the block 1320 illustrated in FIG. 13. For example, the determining module 1520 may be configured to determine, based on the received traffic classification information, that a data packet is associated with a traffic classification. In various embodiments, the determining module 1520 may include on or more of the processor 930, the processor 970, the memory 932, and the memory 972 (FIG. 9).

The device 1500 further includes an including module 1530 for transmitting a wireless communication. The including module 1530 may be configured to perform one or more of the functions discussed above with respect to the block 1330 illustrated in FIG. 13. For example, the including module 1530 may be configured to include, within the data packet associated with the traffic classification, the QoS marker associated with the traffic classification. The including module 1530 may mark the packet with the QoS marker in accordance with the received traffic classification information. In various embodiments, the including module 1530 may include one or more of the processor 930, the processor 970, the memory 932, the memory 972, the TX data processor 914, the TX data processor 938, the transmitter 924, and the transmitter 952 (FIG. 9).

Figure 16:
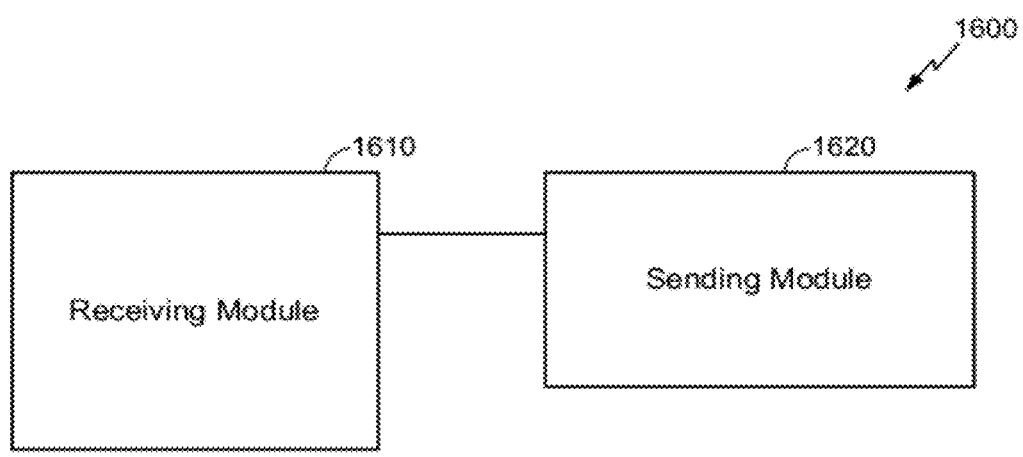
FIG. 16 is a functional block diagram of another exemplary wireless device that may be employed within the wireless communication system of FIG. 1.

FIG. 16 is a functional block diagram of another exemplary wireless device 1600 that may be employed within the wireless communication system of FIG. 1. The device 1600 includes a receiving module 1610. The receiving module 1610 may be configured to perform one or more of the functions discussed above with respect to the block 1410 illustrated in FIG. 14. For example, the receiving module may be configured to receive information related to a differentiated QoS applicable to uplink traffic through a cipher tunnel. In various embodiments, the receiving module 1610 may include one or more of the receiver 922, the receiver 952, the backhaul connection 990, the RX data processor 942, and the RX data processor 960 (FIG. 9).

The device 1600 further includes a sending module 1620. The sending module 1620 may be configured to perform one or more of the functions discussed above with respect to the block 1420 illustrated in FIG. 14. For example, the sending module 1620 may be configured to send, based on the received information, traffic classification information and associated QoS marker information for at least a first uplink traffic flow and a second uplink traffic flow. In an embodiment, the sending module 1620 may send the traffic classification information to, for example, a UE. In various embodiments, the sending module 1620 may one or more of the processor 930, the processor 970, the memory 932, the memory 972, the TX data processor 914, the TX data processor 938, the transmitter 924, and the transmitter 952 (FIG. 9).

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of ordinary skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The foregoing description of the disclosed aspects is provided to enable any person of ordinary skill in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

The invention claimed is:

1. A method that facilitates wireless communications, comprising:
    receiving at a user equipment (UE) from a destination node traffic classification information and associated quality of service (QoS) marker information applicable to uplink traffic through a cipher tunnel from the UE to the destination node;
    determining, based upon the traffic classification information, that a data packet is associated with a traffic classification; and including, within the data packet, a QoS marker associated with the traffic classification.

2. The method of claim 1, wherein the including further comprises including the QoS marker within a header of the data packet.

3. The method of claim 2, wherein the header comprises an IP header or an IPsec header of the data packet.

4. The method of claim 3, wherein the QoS marker comprises a differentiated service code point (DSCP) value or a flow label value.

5. The method of claim 1, further comprising:
at least partially ciphering the data packet;
and transmitting the data packet.

6. The method of claim 5, wherein:
the at least partially ciphering comprises ciphering a payload of the data packet, and
the including further comprises including the QoS marker within a header of the data packet.

7. The method of claim 1, wherein the receiving comprises receiving the QoS marker information over a tunneled communication path.

8. The method of claim 1, wherein the traffic classification information comprises one or more source addresses, differentiated service code point (DSCP) or port numbers.

9. The method of claim 1, wherein the receiving is performed using signaling involved in establishing the cipher tunnel.

10. The method of claim 9, wherein the cipher tunnel is established using Internet Key Encryption version 2 (IKEv2).

11. The method of claim 1, wherein the traffic classification information and associated quality of service (QoS) marker information comprises a mapping between traffic filters and QoS markings.

12. The method of claim 1,
wherein the destination node is a gateway node of a 3GPP network, and
wherein the cipher tunnel from the UE to the gateway node of the 3GPP network passes through an access node of a non-3GPP network.

13. A non-transitory computer-readable medium comprising code that, when executed, causes a computer to:
receive at a user equipment (UE) from a destination node traffic classification information and associated quality of service (QoS) marker information applicable to uplink traffic through a cipher tunnel from the UE to the destination node;
determine, based upon the traffic classification information, that a data packet is associated with a traffic classification; and
include, within the data packet, a QoS marker associated with the traffic classification.

14. The medium of claim 13, further comprising code that, when executed, causes the computer to include the QoS marker within a header of the data packet.

15. The medium of claim 14, wherein the header comprises an IP header or an IPsec header of the data packet.

16. The medium of claim 15, wherein the QoS marker comprises a differentiated service code point (DSCP) value or a flow label value.

17. The medium of claim 13, further comprising code that, when executed, causes the computer to:
at least partially cipher the data packet; and
transmit the data packet.

18. The medium of claim 17, further comprising code that, when executed, causes a computer to:
cipher a payload of the data packet; and
include the QoS marker within a header of the data packet.

19. The medium of claim 13, further comprising code that, when executed, causes the computer to receive the QoS marker information over a tunneled communication path.

20. The medium of claim 13, wherein the traffic classification information comprises one or more source addresses, differentiated service code point (DSCP) or port numbers.

21. The medium of claim 13, wherein the computer receives the traffic classification information and associated quality of service (QoS) marker information using signaling involved in establishing the cipher tunnel.

22. The medium of claim 21, wherein the cipher tunnel is established using Internet Key Encryption version 2 (IKEv2).

23. The medium of claim 13, wherein the traffic classification information and associated quality of service (QoS) marker information comprises a mapping between traffic filters and QoS markings.

24. The medium of claim 13,
wherein the destination node is a gateway node of a 3GPP network, and
wherein the cipher tunnel from the UE to the gateway node of the 3GPP network passes through an access node of a non-3GPP network.

25. A communications device, comprising:
a receiver module configured to receive at a user equipment (UE) from a destination node traffic classification information and associated quality of service (QoS) marker information applicable to uplink traffic through a cipher tunnel from the UE to the destination node;
a processor module configured to determine, based upon the traffic classification information, that a data packet is associated with a traffic classification; and
a transmitter module configured to include, within the data packet, a QoS marker associated with the traffic classification.

26. The communications device of claim 25, wherein the transmitter module is further configured to include the QoS marker within a header of the data packet.

27. The communications device of claim 26, wherein the header comprises an IP header or an IPsec header of the data packet.

28. The communications device of claim 27, wherein the QoS marker comprises a differentiated service code point (DSCP) value or a flow label value.

29. The communications device of claim 25, wherein:
the processor module is further configured to at least partially cipher the data packet; and
the transmitter module is further configured to transmit the data packet.

30. The communications device of claim 29, wherein:
the processor module is further configured to at least partially cipher the data packet by ciphering a payload of the data packet, and
the transmitter module is further configured to include the QoS marker within a header of the data packet.

31. The communications device of claim 25, wherein the receiver module is further configured to receive the QoS marker information over a tunneled communication path.

32. The communications device of claim 25, wherein the traffic classification information comprises one or more source addresses, differentiated service code point (DSCP) or port numbers.

33. The communications device of claim 25, wherein the receiver module is configured to receive the traffic classification information and associated quality of service (QoS) marker information using signaling involved in establishing the cipher tunnel.

34. The communications device of claim 33, wherein the cipher tunnel is established using Internet Key Encryption version 2 (IKEv2).

35. The communications device of claim 25, wherein the traffic classification information and associated quality of service (QoS) marker information comprises a mapping between traffic filters and QoS markings.

36. The communications device of claim 25,
wherein the destination node is a gateway node of a 3GPP network, and
wherein the cipher tunnel from the UE to the gateway node of the 3GPP network passes through an access node of a non-3GPP network.

37. A communications device, comprising:
means for receiving at a user equipment (UE) from a destination node, using signaling involved in establishing a cipher tunnel, traffic classification information and associated quality of service (QoS) marker information applicable to uplink traffic through a cipher tunnel from the UE to the destination node;
means for determining, based upon the traffic classification information, that a data packet is associated with a traffic classification; and
means for including, within the data packet, a QoS marker associated with the traffic classification.

38. The communications device of claim 37, wherein the means for including further comprises means for including the QoS marker within a header of the data packet.

39. The communications device of claim 38, wherein the header comprises an IP header or an IPsec header of the data packet.

40. The communications device of claim 39, wherein the QoS marker comprises a differentiated service code point (DSCP) value or a flow label value.

41. The communications device of claim 37, further comprising:
means for at least partially ciphering the data packet; and
means for transmitting the data packet.

42. The communications device of claim 41, wherein:
the means for at least partially ciphering comprises means for ciphering a payload of the data packet, and
the means for including further comprises means for including the QoS marker within a header of the data packet.

43. The communications device of claim 37, wherein the means for receiving comprises means for receiving the QoS marker information over a tunneled communication path.

44. The communications device of claim 37, wherein the traffic classification information comprises one or more source addresses, differentiated service code point (DSCP) or port numbers.

45. The communications device of claim 37, wherein the means for receiving comprises using signaling involved in establishing the cipher tunnel.

46. The communications device of claim 45, wherein the cipher tunnel is established using Internet Key Encryption version 2 (IKEv2).

47. The communications device of claim 37, wherein the traffic classification information and associated quality of service (QoS) marker information comprises a mapping between traffic filters and QoS markings.

48. The communications device of claim 37,
wherein the destination node is a gateway node of a 3GPP network, and
wherein the cipher tunnel from the UE to the gateway node of the 3GPP network passes through an access node of a non-3GPP network.

49. A method of facilitating wireless communications, comprising:
receiving at a destination node information relating to differentiated quality of service (QoS) applicable to uplink traffic through a cipher tunnel from a user equipment (UE) to the destination node; and
sending from the destination node to the UE, based upon the received information, traffic classification information and associated QoS marker information for a first uplink traffic flow and a second uplink traffic flow.

50. The method of claim 49, wherein the sending comprises sending the QoS marker information over a tunneled communication path.

51. The method of claim 50, wherein the QoS marker comprises a differentiated service code point (DSCP) value, a flow label value, or a security parameter index (SPI) value, and
wherein the traffic classification information comprises one or more source addresses, differentiated service code point (DSCP) or port numbers.

52. The method of claim 49, wherein the sending is performed using signaling involved in establishing the cipher tunnel.

53. The method of claim 52, wherein the cipher tunnel is established using Internet Key Encryption version 2 (IKEv2).

54. The method of claim 49 wherein the traffic classification information and associated QoS marker information pertains to a first security association corresponding to the first uplink traffic flow and a second security association corresponding to the second uplink traffic flow.

55. The method of claim 49, wherein the traffic classification information and associated quality of service (QoS) marker information comprises a mapping between traffic filters and QoS markings.

56. The method of claim 49,
wherein the destination node is a gateway node of a 3GPP network, and
wherein the cipher tunnel from the UE to the gateway node of the 3GPP network passes through an access node of a non-3GPP network.

57. A non-transitory computer-readable medium comprising code that, when executed, causes a computer to:
receive at a destination node information relating to differentiated quality of service (QoS) applicable to uplink traffic through a cipher tunnel from a user equipment (UE) to the destination node; and
send from the destination node to the UE, based upon the received information, traffic classification information and associated QoS marker information for a first uplink traffic flow and a second uplink traffic flow.

58. The medium of claim 57, further comprising code that, when executed, causes the computer to send the QoS marker information over a tunneled communication path.

59. The medium of claim 58, wherein the QoS marker comprises a differentiated service code point (DSCP) value, a flow label value, or a security parameter index (SPI) value, and
wherein the traffic classification information comprises one or more source addresses, differentiated service code point (DSCP) or port numbers.

60. The medium of claim 57, wherein the computer sends the traffic classification information and associated QoS marker information using signaling involved in establishing the cipher tunnel.

61. The medium of claim 60, wherein the cipher tunnel is established using Internet Key Encryption version 2 (IKEv2).

62. The medium of claim 57 wherein the traffic classification information and associated QoS marker information pertains to a first security association corresponding to the first uplink traffic flow and a second security association corresponding to the second uplink traffic flow.

63. The medium of claim 57, wherein the traffic classification information and associated quality of service (QoS) marker information comprises a mapping between traffic filters and QoS markings.

64. The medium of claim 57,
wherein the destination node is a gateway node of a 3GPP network, and
wherein the cipher tunnel from the UE to the gateway node of the 3GPP network passes through an access node of a non-3GPP network.

65. A communications device, comprising:
a receiver module configured to receive at a destination node information relating to differentiated quality of service (QoS) applicable to uplink traffic through a cipher tunnel from a user equipment (UE) to the destination node;
a transmitter module configured to send from the destination to the UE, based upon the received information, traffic classification information and associated QoS marker information for a first uplink traffic flow and a second uplink traffic flow.

66. The communications device of claim 65, wherein the transmitter module is further comprised to send the traffic classification information and associated QoS marker information over a tunneled communication path.

67. The communications device of claim 66, wherein the QoS marker comprises a differentiated service code point (DSCP) value, a flow label value, or a security parameter index (SPI) value, and
wherein the traffic classification information comprises one or more source addresses, differentiated service code point (DSCP) or port numbers.

68. The communications device of claim 65, wherein the transmitter module is configured to send the traffic classification information and associated QoS marker information using signaling involved in establishing the cipher tunnel.

69. The communications device of claim 68, wherein the cipher tunnel is established using Internet Key Encryption version 2 (IKEv2).

70. The communications device of claim 65, wherein the traffic classification information and associated QoS marker information pertains to a first security association corresponding to the first uplink traffic flow and a second security association corresponding to the second uplink traffic flow.

71. The communications device of claim 65, wherein the traffic classification information and associated quality of service (QoS) marker information comprises a mapping between traffic filters and QoS markings.

72. The communications device of claim 65,
wherein the destination node is a gateway node of a 3GPP network, and
wherein the cipher tunnel from the UE to the gateway node of the 3GPP network passes through an access node of a non-3GPP network.

73. A communications device, comprising:
means for receiving at a destination node information relating to differentiated quality of service (QoS) applicable to uplink traffic through a cipher tunnel from a user equipment (UE) to the destination node; and
means for sending from the destination node to the UE, based upon the received information, traffic classification information and associated QoS marker information for a first uplink traffic flow and a second uplink traffic.

74. The communications device of claim 73, wherein the means for sending comprises means for sending the QoS marker information over a tunneled communication path.

75. The communications device of claim 74, wherein the QoS marker comprises a differentiated service code point (DSCP) value, a flow label value, or a security parameter index (SPI) value, and
wherein the traffic classification information comprises one or more source addresses, differentiated service code point (DSCP) or port numbers.

76. The communications device of claim 73, wherein the means for sending comprises using signaling involved in establishing the cipher tunnel.

77. The communications device of claim 76, wherein the cipher tunnel is established using Internet Key Encryption version 2 (IKEv2).

78. The communications device of claim 73, wherein the traffic classification information and associated QoS marker information pertains to a first security association corresponding to the first uplink traffic flow and a second security association corresponding to the second uplink traffic flow.

79. The communications device of claim 73, wherein the traffic classification information and associated quality of service (QoS) marker information comprises a mapping between traffic filters and QoS markings.

80. The communications device of claim 73,
wherein the destination node is a gateway node of a 3GPP network, and
wherein the cipher tunnel from the UE to the gateway node of the 3GPP network passes through an access node of a non-3GPP network.

* * * * *